US009013728B2

(12) United States Patent
Adachi et al.

(10) Patent No.: US 9,013,728 B2
(45) Date of Patent: Apr. 21, 2015

(54) IMAGE PROCESSING SYSTEMS THAT PERFORM COMMUNICATION USING AT LEAST TWO COMMUNICATION PROTOCOLS, DATA PROCESSING APPARATUSES THAT PERFORM COMMUNICATION USING AT LEAST TWO COMMUNICATION PROTOCOLS, AND COMPUTER-READABLE MEDIA STORING INSTRUCTIONS FOR SUCH DATA PROCESSING APPARATUSES

(71) Applicants: Toyoshi Adachi, Iwakura (JP); Naoki Nishikawa, Nagoya (JP)

(72) Inventors: Toyoshi Adachi, Iwakura (JP); Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 4 days.

(21) Appl. No.: 14/065,214

(22) Filed: Oct. 28, 2013

(65) Prior Publication Data
US 2014/0118769 A1 May 1, 2014

(30) Foreign Application Priority Data
Oct. 29, 2012 (JP) .................................. 2012-237746

(51) Int. Cl.
*G06F 3/12* (2006.01)
*H04N 1/32* (2006.01)

(52) U.S. Cl.
CPC .......... *H04N 1/32026* (2013.01); *G06F 3/1211* (2013.01); *G06F 3/1236* (2013.01); *G06F 3/1292* (2013.01); *G06F 3/1237* (2013.01)

(58) Field of Classification Search
None
See application file for complete search history.

(56) References Cited

U.S. PATENT DOCUMENTS 5,963,344 A * 10/1999 Morita et al. ................. 358/482
8,478,196 B1 * 7/2013 Hewinson ................... 455/41.1
(Continued)

FOREIGN PATENT DOCUMENTS

| JP | 2007-166538 A | 6/2007 |
|----|---------------|--------|
| JP | 2011-146991 A | 7/2011 |
| WO | 2010107125 A1 | 9/2010 |

OTHER PUBLICATIONS

European Patent Office, extended European Search Report for European Patent Application No. 13190718.0 (counterpart European patent application), dated May 2, 2014.

*Primary Examiner* — Jeremiah Bryar
(74) *Attorney, Agent, or Firm* — Baker Botts L.L.P.

(57) ABSTRACT

Image processing systems include image processing apparatuses and information processing apparatuses. Image processing apparatuses include first and second communication devices, which communicate using first and second communication protocols, respectively. Information processing apparatuses include third and fourth communication devices, which communicate using the first and second communication protocols, respectively. First and third communication devices communicate therebetween using the first communication protocol to transmit connection information therebetween. The connection information includes information for establishing communication using the second communication protocol. Second and fourth communication devices use the connection information to establish communication therebetween using the second communication protocol to transmit image data therebetween. Image processing apparatuses and information processing apparatuses start processes for completing a job prior to second and fourth communication devices establishing communication therebetween using the second communication protocol.

24 Claims, 17 Drawing Sheets

(56) References Cited

U.S. PATENT DOCUMENTS

| | | | |
|---|---|---|---|
| 2002/0159087 A1* | 10/2002 | Yoshida et al. | 358/1.15 |
| 2005/0099962 A1* | 5/2005 | Matsuda | 370/254 |
| 2009/0036056 A1 | 2/2009 | Oshima et al. | |
| 2009/0066998 A1 | 3/2009 | Kato | |
| 2011/0126110 A1* | 5/2011 | Vilke et al. | 715/736 |
| 2011/0177780 A1 | 7/2011 | Sato et al. | |

* cited by examiner

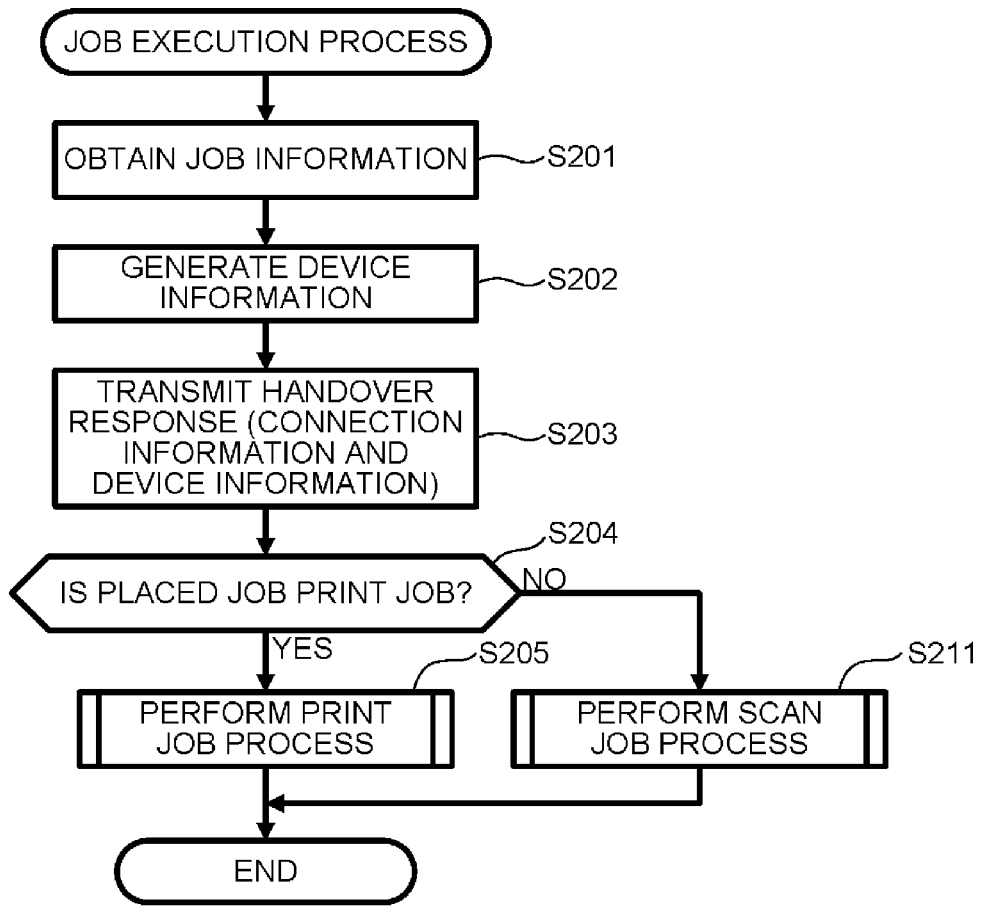

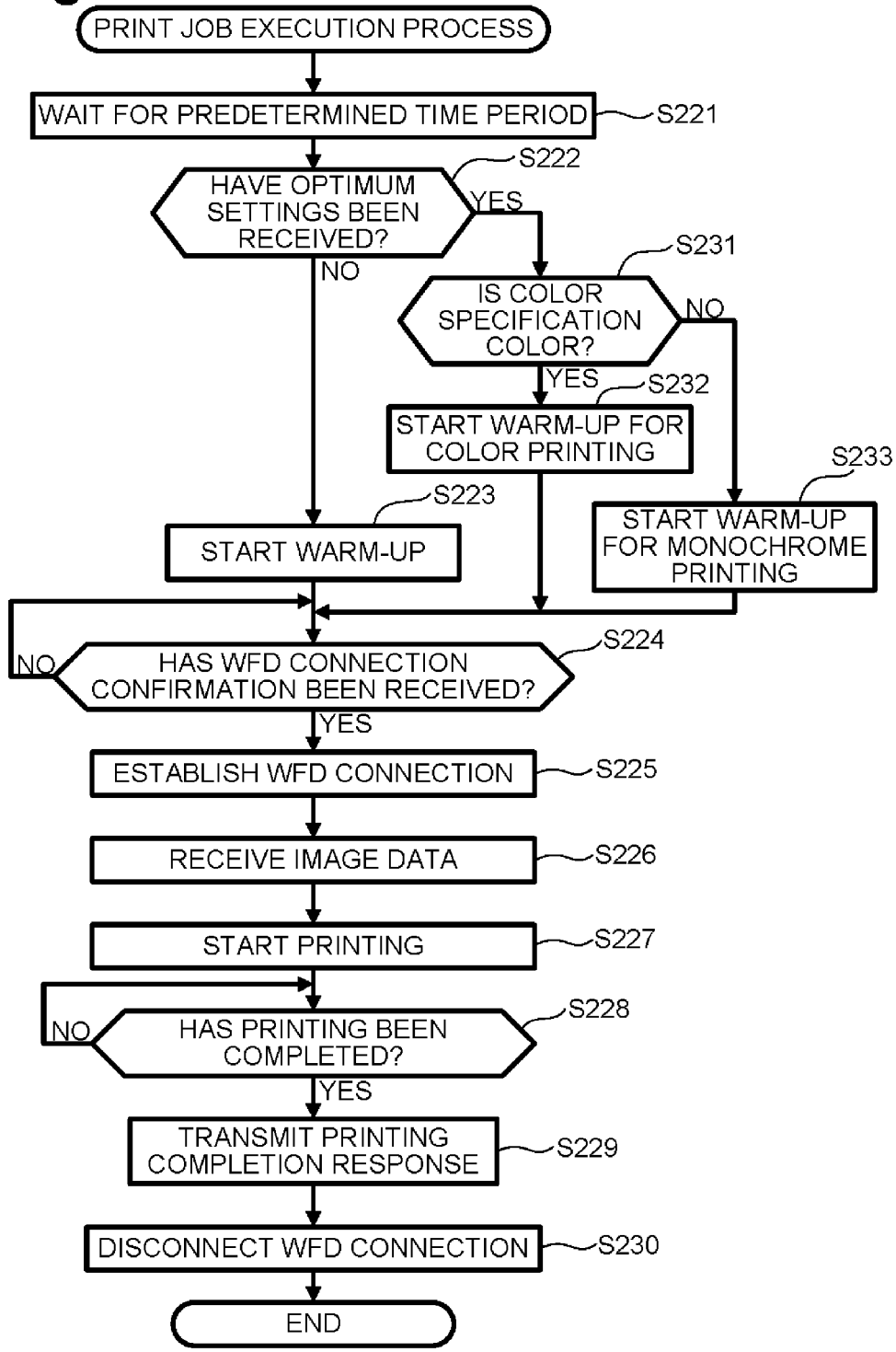

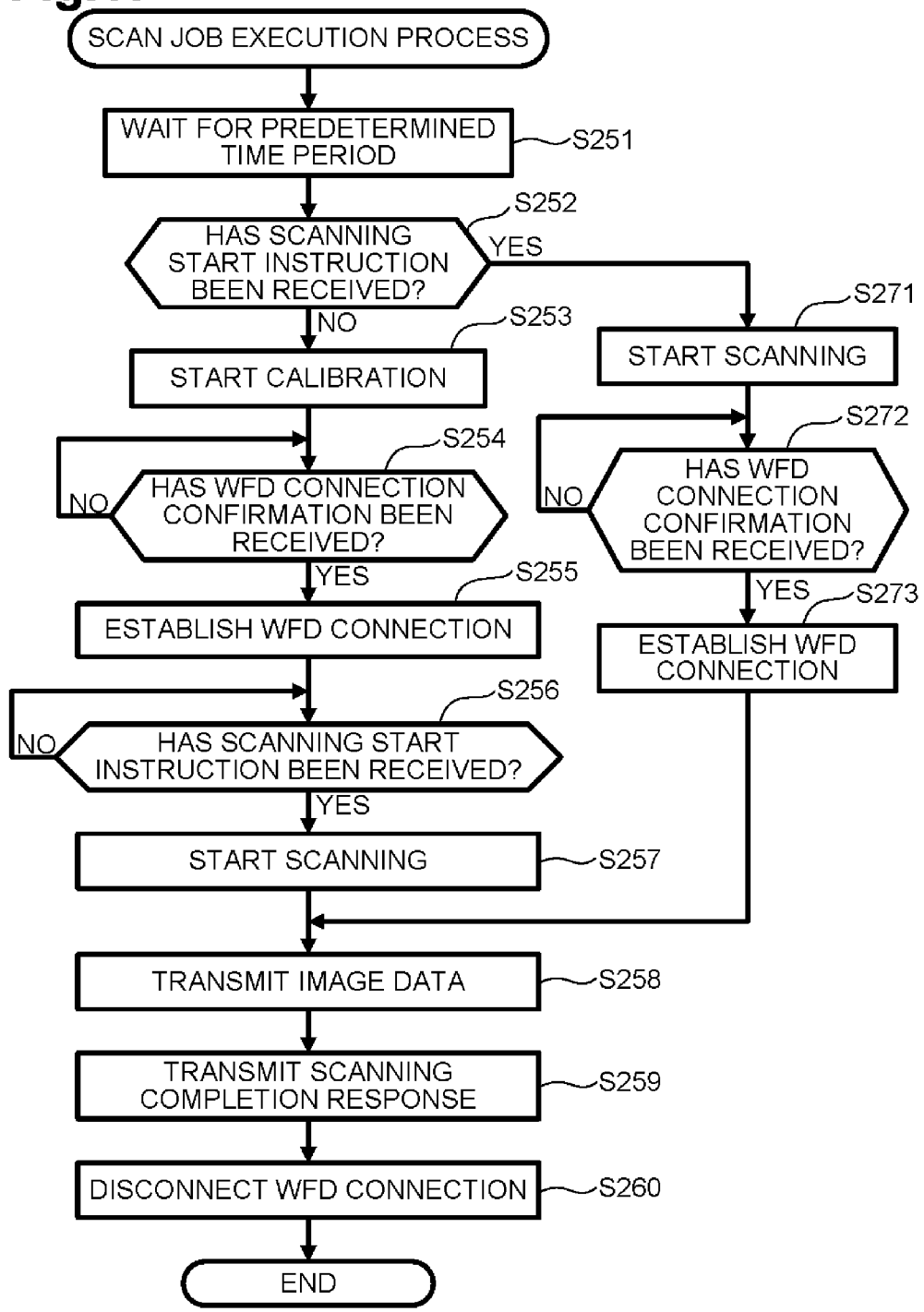

IMAGE PROCESSING SYSTEMS THAT PERFORM COMMUNICATION USING AT LEAST TWO COMMUNICATION PROTOCOLS, DATA PROCESSING APPARATUSES THAT PERFORM COMMUNICATION USING AT LEAST TWO COMMUNICATION PROTOCOLS, AND COMPUTER-READABLE MEDIA STORING INSTRUCTIONS FOR SUCH DATA PROCESSING APPARATUSES

CROSS-REFERENCE TO RELATED APPLICATION

This application claims priority from Japanese Patent Application No. 2012-237746, filed on Oct. 29, 2012, the disclosure of which is incorporated herein by reference.

BACKGROUND OF THE DISCLOSURE

1. Field of the Disclosure

The invention relates to an image processing apparatus configured to perform image processing, such as, for example, printing and scanning; an information processing apparatus; and an image processing system. More specifically, the invention relates to a technique of executing a job through data communication between an image processing apparatus and an information processing apparatus using a plurality of wireless communication protocols.

2. Description of the Related Art

Recently, a plurality of wireless communication protocols, such as a Bluetooth® protocol (Bluetooth® is a registered trademark owned by BLUETOOTH SIG. INC. of Kirkland, Wash.), a Wireless Fidelity ("Wi-Fi®") protocol (Wi-Fi® is a registered certification mark owned by the Wi-Fi Alliance of Austin, Tex.), and a Near Field Communication ("NFC") protocol, have been made available for wireless communication between an electronic device, such as a smartphone or a tablet personal computer ("PC"), and an image processing apparatus, such as a scanner or a printer. In a known method of wireless communication, the NFC protocol is used first to transmit one of authentication information and setting information, and then, the wireless communication protocol is changed from the NFC protocol to another wireless communication protocol that has a longer communication range and offers higher-speed communication than the NFC protocol. The above-described technique of changing the wireless communication protocol is referred to as a handover technique.

In the known handover technique, the communication device obtains a communication protocol and an encryption method via short-range wireless communication from the other communication device. When the obtained communication protocol and encryption method match with the communication protocol and encryption method specified in the communication device, data communication is performed between the communication device and the other communication device using the obtained communication protocol and encryption method.

SUMMARY OF THE DISCLOSURE

The known handover technique has at least the following problem. When one of scanning and printing is performed after communication is established between the communication device and the other communication device through a handover, only connection information may be transmitted via short-range wireless communication. Therefore, in such configurations, information necessary to start the execution of a job may only be transmitted after the communication protocol is changed to long-range wireless communication. Thus, it may take a long time to start the execution of the job when using the known handover technique.

Accordingly, aspects of the invention may address the above-described problem of the known handover technique. That is, aspects of the invention provide for an image processing system, an image processing apparatus, and an information processing apparatus that may advance a start time of job execution and shorten a time required to complete a job.

Image processing systems disclosed herein may comprise an image processing apparatus and an information processing apparatus. The image processing apparatus may comprise a first communication device and a second communication device. The first communication device may be configured to communicate using a first communication protocol. The second communication device may be configured to communicate using a second communication protocol. The information processing apparatus may comprise a third communication device and a fourth communication device. The third communication device may be configured to communicate using the first communication protocol. The fourth communication device may be configured to communicate using the second communication protocol. The first communication device and the third communication device may be configured to communicate therebetween using the first communication protocol to transmit connection information between the first communication device and the third communication device. The connection information may comprise information for establishing communication using the second communication protocol. The second communication device and the fourth communication device may be configured to use the connection information to establish communication therebetween using the second communication protocol and to transmit image data between the second communication device and the fourth communication device using the second communication protocol. At least one of the image processing apparatus and the information processing apparatus may be configured to start one or more processing steps for completing a job prior to the second communication device and the fourth communication device establishing communication therebetween using the second communication protocol.

Data processing apparatuses disclosed herein may comprise a controller, a communication device, and an other communication device. The controller may comprise one or more control devices. The communication device may be configured to communicate using a first communication protocol. The other communication device may be configured to communicate using a second communication protocol. The controller may be configured to control the communication device to communicate with an external device using the first communication protocol to transmit connection information between the communication device and the external device. The connection information may comprise information for establishing communication using the second communication protocol. The controller may be configured to control the other communication device to communicate with the external device using the second communication protocol after the connection information is used to establish communication between the other communication device and the external device using the second communication protocol. The communication between the other communication device and the external device using the second communication protocol may comprise at least one of a process of transmitting image data and receiving the image data. In particular the process of transmitting the image data may comprise transmitting the image data from the other communication device to the external device. Further, the process of receiving the image data may comprise receiving the image data by the other communication device from the external device. The controller may be configured to control the data processing apparatus to start one or more processing steps for completing a job prior to the communication between the other communication device and the external device using the second communication protocol being established.

Non-transitory computer-readable media disclosed herein may store computer-readable instructions thereon. The computer-readable instructions may, when executed by a processor of a data processing apparatus, instruct the processor to perform certain processes. The certain processes may comprise a process of controlling a communication device to communicate with an external device using a first communication protocol to transmit connection information between the communication device and the external device. The connection information comprising information for establishing communication using a second communication protocol. The certain processes may comprise a process of controlling an other communication device to communicate with the external device using the second communication protocol after the connection information is used to establish communication between the other communication device and the external device using the second communication protocol. The communication between the other communication device and the external device using the second communication protocol may comprise at least one of a process of transmitting image data and receiving the image data. In particular the process of transmitting the image data may comprise transmitting the image data from the other communication device to the external device. Further, the process of receiving the image data may comprise receiving the image data by the other communication device from the external device. The certain processes may comprise a process of controlling the data processing apparatus to start one or more processing steps for completing a job prior to the communication between the other communication device and the external device using the second communication protocol being established.

In image processing systems disclosed herein, both of the image processing apparatus and the information processing apparatus may support both wireless communication of short-range communication, which may be wireless communication in compliance with the first communication protocol, and long-range communication, which may be wireless communication in compliance with the second communication protocol. Of the image processing apparatus and the information processing apparatus, one device may be configured to instruct the execution of a job (e.g., a mobile device) and the other device may be configured to execute the job (e.g., a multifunction peripheral). The image processing apparatus and the information processing apparatus may be examples of data processing apparatuses and external devices.

In image processing systems disclosed herein, for example, when short-range communication is established between the image processing apparatus and the information processing apparatus in a state where a condition for allowing one of the communication devices to execute a job (hereinafter, referred to as a "job execution condition") is satisfied, the connection information to be used for the establishment of long-range communication and the specific information received from one of the image processing apparatus and the information processing apparatus may be transmitted via short-range communication. The state where the job execution condition may be satisfied may be, for example, a state where a job that the one of the communication devices may perform has been determined or a state where the one of the communication devices is in a state of readiness to execute the job. The specific information may be, for example, performance information (e.g., information regarding processing capability of a device) or status information (e.g., information regarding a status of a device) of one of the image processing apparatus and the information processing apparatus when the one of the image processing apparatus and the information processing apparatus is to perform the job, or information related to image processing, such as printing or scanning, when one of the image processing apparatus and the information processing apparatus is to instruct the execution of the job. Consequently, at least one of the image processing apparatus and the information processing apparatus may start at least one or more processing steps of the process for completing the job by using the received specific information. The process for completing the job may be, for example, accepting of changes of job settings, generation of data to be transmitted to one of the image processing apparatus and the information processing apparatus, calibration of an image reading portion, reading, or a warm-up of an image forming portion.

That is, in the image processing system disclosed herein, the specific information to be used for the job execution may be also transmitted when the connection information is transmitted via short-range communication. Therefore, at least one or more processing steps of the process for completing the job may be started before long-range communication is established. With this configuration, the process for completing the job may be started without waiting the establishment of long-range communication, whereby it may be expected that the time required to complete the job may be shortened.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 15 is a flowchart showing steps in an example job execution process performed by the MFP.

FIG. 16 is a flowchart showing steps in an example print job execution process performed by the MFP.

FIG. 17 is a flowchart showing steps in an example scan job execution process performed by the MFP.

DETAILED DESCRIPTION OF EMBODIMENTS OF THE INVENTION

Hereinafter, an image processing system according to illustrative configurations is described in detail with reference to the accompanying drawings. In particular configurations, the aspects of the invention may be applied to an image processing system comprising a multifunction peripheral ("MFP") configured to perform a scanning function and a printing function and a mobile device configured to accept a job for allowing the MFP to perform image processing.

Figure 1:
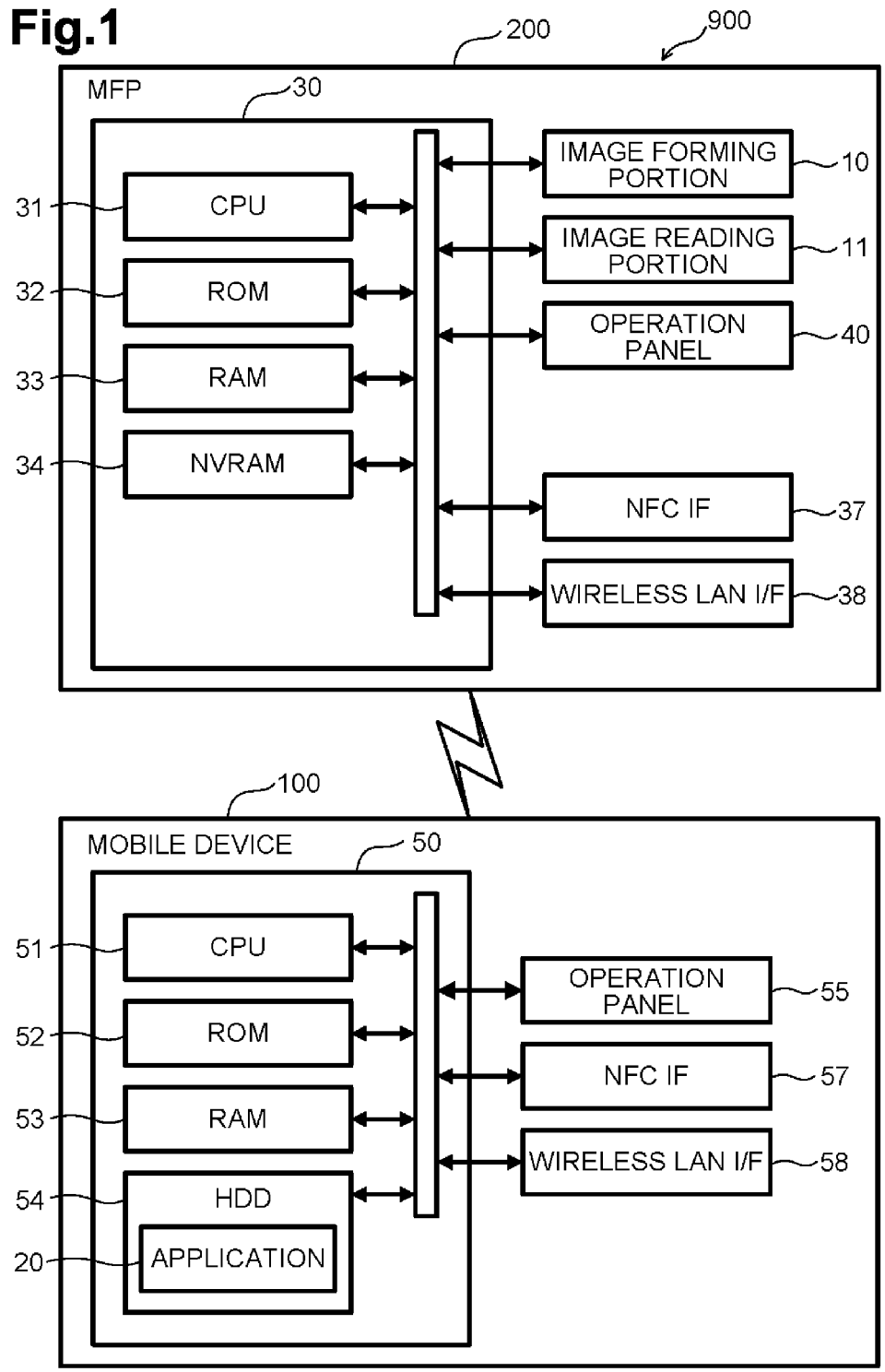
FIG. 1 is a block diagram showing an example configuration of an image processing system.

As shown in FIG. 1, an image processing system 900 (an example of an image processing system) according to particular configurations may comprise a mobile device 100 (an example of an information processing apparatus) and an MFP 200 (an example of an image processing apparatus). The mobile device 100 may be configured to output a job to a specified MFP, such as the MFP 200, for example. The MFP 200 may be configured to execute a job. In the image processing system 900, at least one of data transmission and reception may be available between the mobile device 100 and the MFP 200 via wireless communication.

One or more information processing apparatuses, through which a job that instructs the MFP 200 to perform image processing may be placed, may be included in the image processing system 900 and connected to the MFP 200, as well as to the mobile device 100. Further, one or more servers or access points may be connected to the image processing system 900, and communication may be performed between the mobile device 100 and the MFP 200 via the one or more servers or access points.

A general configuration of the MFP 200 is described. As shown in FIG. 1, the MFP 200 may comprise a control device 30 that may comprise, for example, a central processing unit ("CPU") 31, a read-only memory ("ROM") 32, a random-access memory ("RAM") 33, and a nonvolatile random-access memory ("NVRAM") 34. The MFP 200 may further comprise an image forming portion 10 (an example of an image processing device), an image reading portion 11 (another example of the image processing device), an operation panel 40, an NFC interface ("I/F") 37 (an example of an image-processing-side first communication device), and a wireless local-area network ("LAN") I/F 38 (an example of an image-processing-side second communication device), with which the control device 30 may be electrically connected. The image forming portion 10 may be configured to print an image onto a sheet. The image reading portion 11 may be configured to read an image from a document. The operation panel 40 may be configured to display operating statuses and to accept an input operation.

The image forming portion 10 may be configured to perform at least one of color printing and monochrome printing. Further, the image forming portion 10 may be configured to perform printing by using at least one of an electrophotographic method and an inkjet method. Moreover, the image reading portion 11 may be configured to perform at least one of color scanning and monochrome scanning. A scanning mechanism may utilize at least one of a charge-coupled device ("CCD") and a contact image sensor ("CIS").

The ROM 32 may be configured to store various settings and firmware, such as various control programs for controlling the MFP 200, as well as certain initial values. The RAM 33 and the NVRAM 34 may be used as workspaces, respectively, for temporarily storing the control programs read from the ROM 32 or as storage areas, respectively, for temporarily storing data.

The CPU 31 may store processing results in at least one of the RAM 33 and the NVRAM 34 in response to executing various programs read from at least one of the ROM 32, the programs read from the NVRAM 34, and signals sent from sensors.

The NFC I/F 37 may enable the MFP 200 to perform wireless communication using an NFC protocol in compliance with the International standards (e.g., ISO/IEC 21481 and ISO/IEC 18092, as defined by the International Organization for Standardization). The MFP 200 may be configured to transmit data, receive data, or both, via the NFC I/F 37, to or from an external device.

The wireless LAN I/F 38 may enable the MFP 200 to perform wireless communication using a Wi-Fi Direct ("WFD") protocol (in compliance with the IEEE 802.11 standard and the related family of standards defined by the Institute of Electrical and Electronics Engineers ("IEEE"). The NFC protocol and the WFD protocol may utilize different communication protocols (e.g., standards for wireless communication). For example, the communication protocol of the WFD protocol may enable a greater communication range and a faster communication speed than the communication protocol of the NFC protocol. The MFP 200 may be configured to transmit data, receive data, or both, via the wireless LAN I/F 38, to or from an external device.

In the WFD protocol, a network may be configured between a device, which may serve as a group owner and manage the network (hereinafter, referred to as a "group-owner-status device"), and a device, which may serve as a client (hereinafter, referred to as a "client-status device"). The WFD protocol may utilize a communication protocol that may allow at least one of transmission of data and reception of data between the group-owner-status device and the client-status device in the network. Therefore, for the MFP 200 to perform data communication with an external device via the wireless LAN I/F 38, the MFP 200 may need to configure a WFD network with the external device by establishing wireless communication with the external device. The MFP 200 may serve as the group owner, for example, and the mobile device 100 may serve as the client, for example, when the WFD network is configured. Devices other than the mobile device 100 also may participate in the WFD network as client-status devices in addition to or in place of the mobile device 100. The MFP 200 may be configured to store identifying information of a client-status device and connection information for establishing wireless communication using the WFD protocol with the client-status device. The connection information may comprise, for example, a service set identifier ("SSID"), which may be an identifier for identifying a WFD network, and a password.

Figure 2:
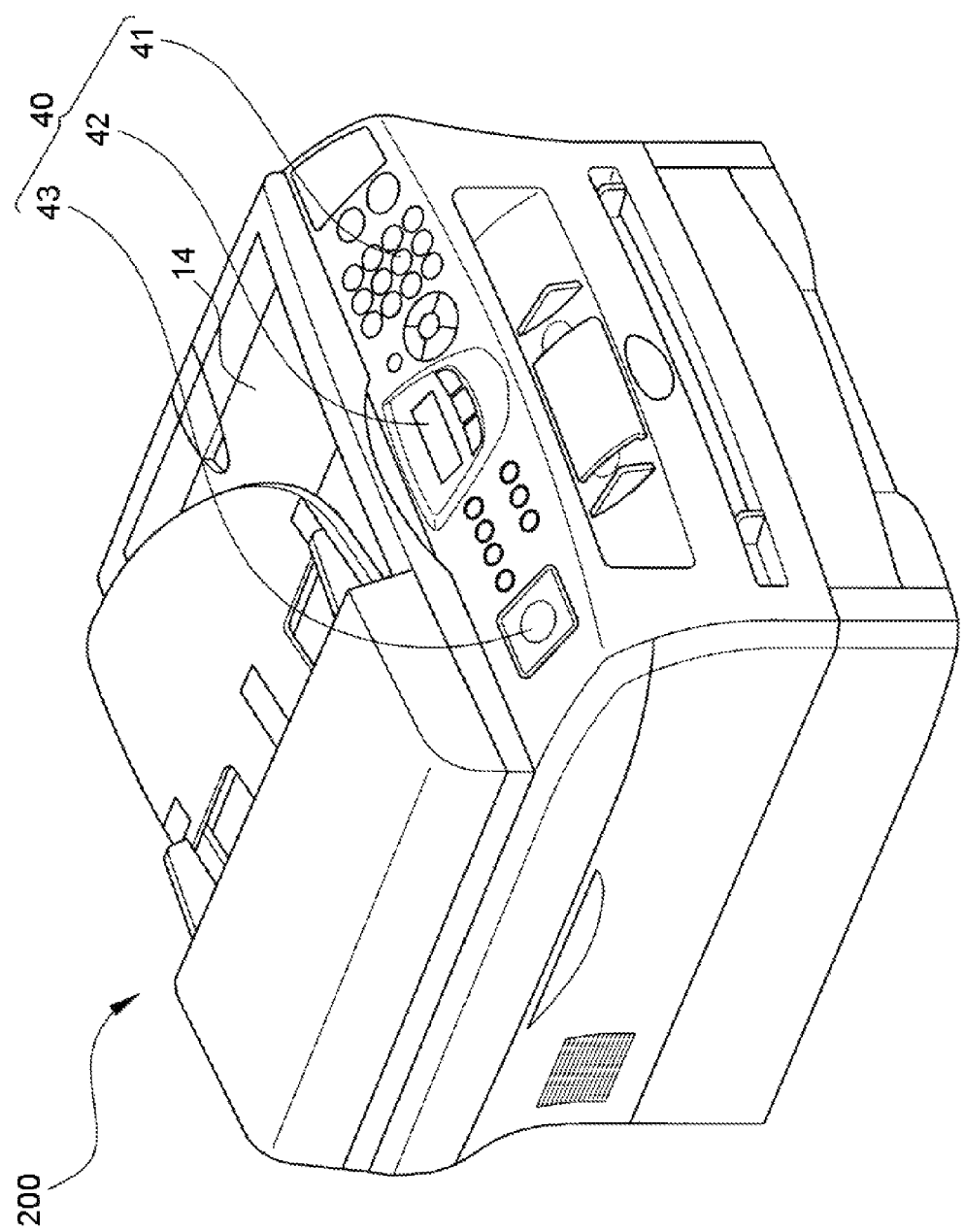
FIG. 2 is a perspective view showing an example configuration of a multifunction peripheral ("MFP").

As shown in FIG. 2, the operation panel 40 may be disposed on the exterior of the MFP 200 and may comprise an input portion 41 and a display 42. The input portion 41 may comprise various buttons for accepting inputs. The display 42 may be configured to display various messages and details of settings. The various buttons may comprise, for example, an OK button for instructing a start of image processing and a cancel button for instructing a cancel of image processing.

The operation panel 40 may further comprise an NFC reader 43 for establishing wireless communication using the NFC protocol. The NFC reader 43 may comprise the NFC I/F 37. While the power of the MFP 200 is on, the MFP 200 may be in a state of readiness to detect a device that may perform wireless communication using the NFC protocol (hereinafter, referred to as an "NFC-enabled device") by using signals issued from the NFC I/F 37. For example, when the mobile device 100 is held over the NFC reader 43, the MFP 200 may detect the mobile device 100, and wireless communication using the NFC protocol between the mobile device 100 and the MFP 200 may be enabled automatically. Holding the mobile device 100 over the NFC reader 43 may be sufficient to dispose the mobile device 100 within a communicable range of the NFC I/F 37, and thus, it may be unnecessary for the mobile device 100 and the NFC reader 43 to be in contact with each other.

A general configuration of the mobile device 100 is now described. As shown in FIG. 1, the mobile device 100 may comprise a control device 50 that may comprise a CPU 51, a ROM 52, a RAM 53, and a hard disk drive ("HDD") 54. The mobile device 100 may further comprise a touch-sensitive operation panel 55, an NFC I/F 57 (an example of an information-processing-side first communication device), and a wireless LAN I/F 58 (an example of an information-processing-side second communication device), which may be controlled by the control device 50. The operation panel 55 may be configured to perform a display function and an input function. The NFC I/F 57 may be a communication I/F that may allow the mobile device 100 to perform communication with the external device.

The HDD 54 of the mobile device 100 may store an operating system ("OS"), browsers for browsing files on the Internet, and device drivers for controlling various devices. The HDD 54 may also store an application program (hereinafter, referred to as an "application 20") that may enable the mobile device 100 to accept a job that ultimately instructs the MFP 200 to perform image processing, such as one or more of printing and scanning, for example, and that may control the mobile device 100 to transmit image data accompanied by the image processing to the MFP 200.

Figure 3:
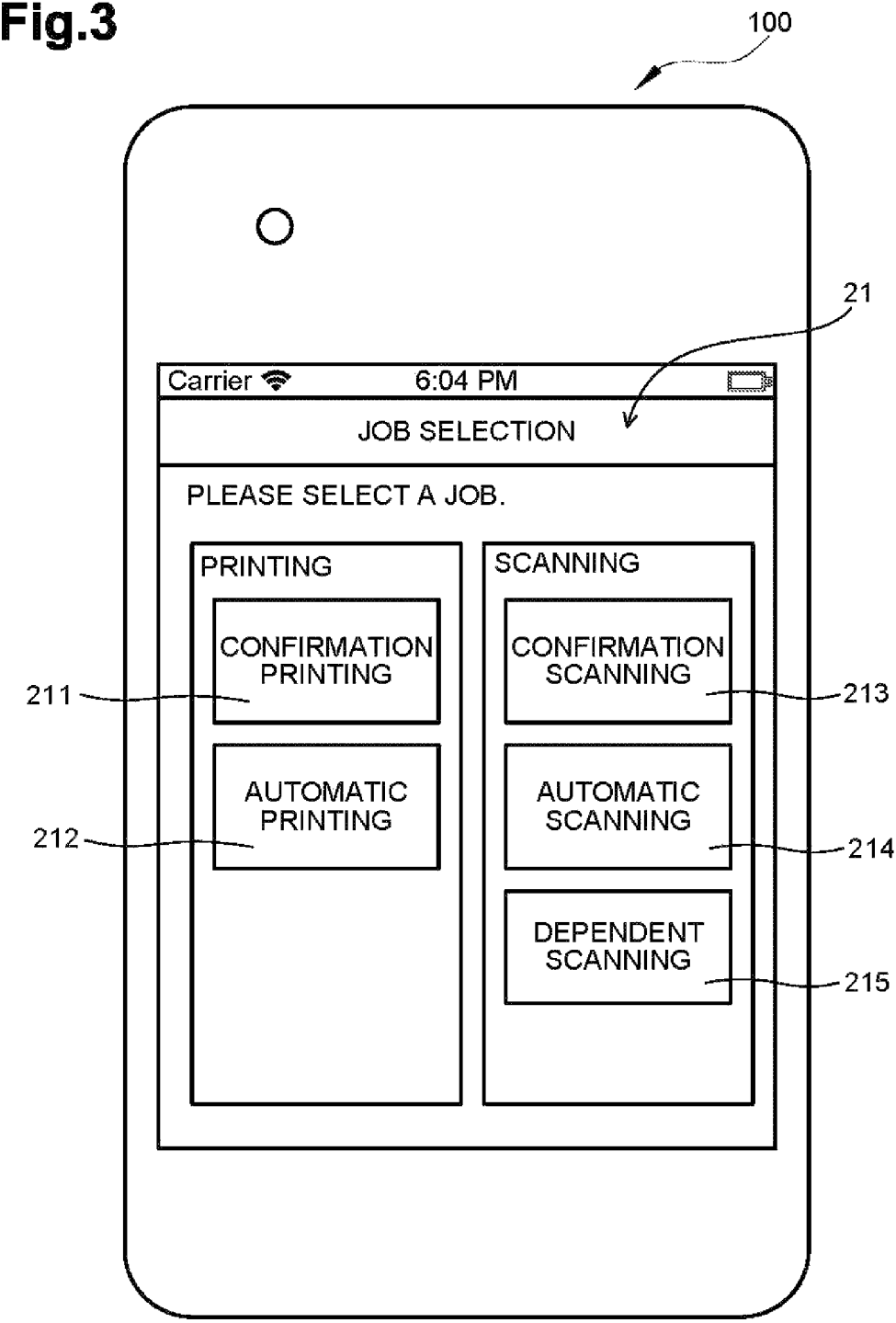
FIG. 3 is a schematic diagram showing an example of an initial screen of an application.

The above-described application 20 may be started by the CPU 51 when the mobile device 100 accepts a start instruction. As shown in FIG. 3, the application 20 may display a selection screen 21, as an initial screen, which may allow the selection of a job type.

Jobs that the application 20 may accept may comprise, for example, print jobs and scan jobs. Further, the print jobs may comprise a confirmation print mode and an automatic print mode. A print job associated with the confirmation print mode may allow the MFP 200 to start printing after print settings are confirmed. A print job associated with the automatic print mode may allow the MFP 200 to start printing in accordance with print settings determined in the application 20 without the print settings confirmed. The scan jobs may comprise a confirmation scan mode, an automatic scan mode, and a dependent scan mode. A scan job associated with the confirmation scan mode may allow the MFP 200 to read one or more documents after scan settings are confirmed. A scan job associated with the automatic scan mode may allow the MFP 200 to read one or more documents in accordance with scan settings determined in the application 20 without the scan settings confirmed. A scan job associated with the dependent scan mode may allow the MFP 200 to read one or more documents in accordance with scan settings specified in the MFP 200. The selection screen 21 may comprise a "CONFIRMATION PRINTING" button 211 for selecting a print job associated with the confirmation print mode, an "AUTOMATIC PRINTING" button 212 for selecting a print job associated with the automatic print mode, a "CONFIRMATION SCANNING" button 213 for selecting a scan job for the confirmation scan mode, an "AUTOMATIC SCANNING" button 214 for selecting a scan job associated with the automatic scan mode, and a "DEPENDENT SCANNING" button 215 for selecting a scan job associated with the dependent scan mode.

When one of the "CONFIRMATION PRINTING" button 211 and the "AUTOMATIC PRINTING" button 212 is touched, for example, the application 20 may change the selection screen 21 to a print target selection screen that may accept a selection of data to be printed. The print target selection screen may display, for example, names or thumbnail images of data in a list form. When one of the name and the thumbnail image of data desired to be printed is touched, the data to be printed may be selected. When the data to be printed is selected, a print job is placed in a job queue of the mobile device 100.

When one of the "CONFIRMATION SCANNING" button 213, the "AUTOMATIC SCANNING" button 214, and the "DEPENDENT SCANNING" button 215 is touched on the selection screen 21, the application 20 may place a scan job in the job queue of the mobile device 100. In some configurations, for example, the application 20 may display a storage destination selection screen for allowing the selection of a storage destination for read image data before placing a scan job in the job queue. Operations of the application 20 after one of a print job and a scan job is placed in the job queue are described below.

The CPU 51 may store processing results in one or more of the RAM 53 and the HDD 54, in response to executing various control programs read from the ROM 52 and/or the programs read from the HDD 54. The operations of the application 20 may be processed by the CPU 51.

Similar to the NFC I/F 37 of the MFP 200, the NFC I/F 57 may enable the mobile device 100 to perform wireless communication using the NFC protocol. Similar to the wireless LAN I/F 38 of the MFP 200, the wireless LAN I/F 58 may enable the mobile device 100 to perform wireless communication using the WFD protocol. The mobile device 100 may be configured to transmit data, receive data, or both to or from the external device via one or more of the NFC I/F 57 and the wireless LAN I/F 58.

A procedure for performing data communication between the mobile device 100 and the MFP 200 after a print job is placed in the mobile device 100 is described for each case of the confirmation print mode and the automatic print mode.

Figure 4:
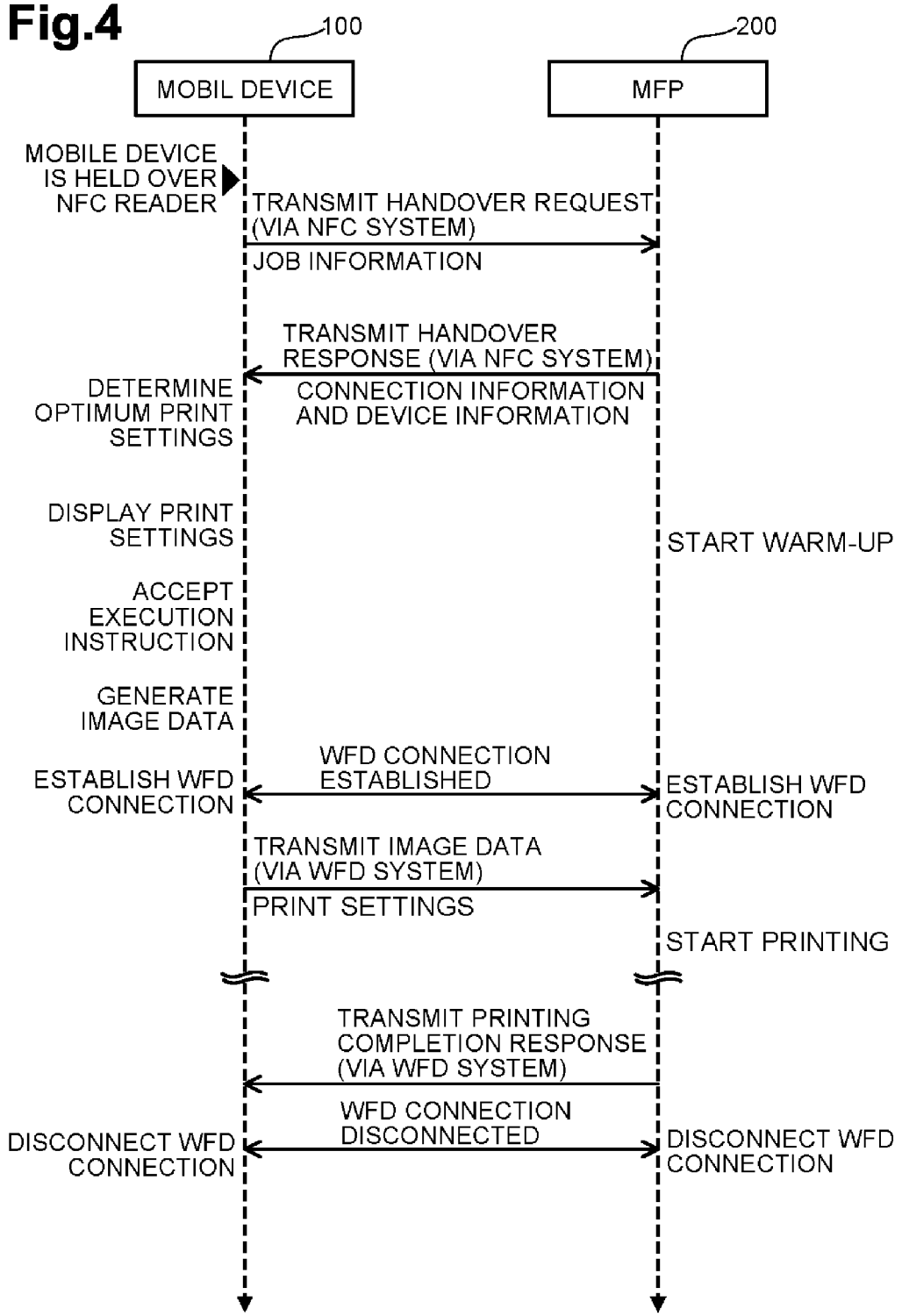
FIG. 4 is a sequence diagram showing an example process of data communication performed between a mobile device and the MFP in a confirmation print mode.

Operation steps performed when a print job for the confirmation print mode is placed now are described with reference to a sequence diagram shown in FIG. 4. The mobile device 100 may be held over the NFC reader portion 43 of the MFP 200 while a print job for the confirmation print mode is placed in the mobile device 100. By doing so, the MFP 200 may detect the mobile device 100, and thus, wireless communication using the NFC protocol may become available between the mobile device 100 and the MFP 200.

When the wireless communication using the NFC protocol becomes available between the mobile device 100 and the MFP 200, the mobile device 100 may transmit a handover request to the MFP 200. The handover request may be transmitted via the wireless communication using the NFC protocol.

The handover request may further comprise job information in addition to handover information necessary to change the currently-used communication protocol to the WFD protocol. The job information may comprise at least information identifying a print job or a scan job. In some configurations, for example, the job information may further comprise, for example, one or more of information identifying the confirmation print mode or the automatic print mode and information identifying color or monochrome.

Upon receipt of the handover request from the mobile device 100, the MFP 200 may transmit a response to the handover request (hereinafter, referred to as a "handover response") to the mobile device 100. The handover response may comprise connection information, which may be used to establish a connection using the WFD protocol, and device information of the MFP 200. The device information may be a combination of performance information, which may store information regarding a processing capability of the MFP 200, and status information, which may store information regarding a status of the MFP 200. The handover response may be transmitted via the wireless communication using the NFC protocol.

After transmitting the handover response to the mobile device 100, the MFP 200 may start a warm-up of the image forming portion 10. The warm-up may comprise, for example, a warm-up of a fixing device and a correction operation, such as a color-registration-error correction process.

Figure 5:
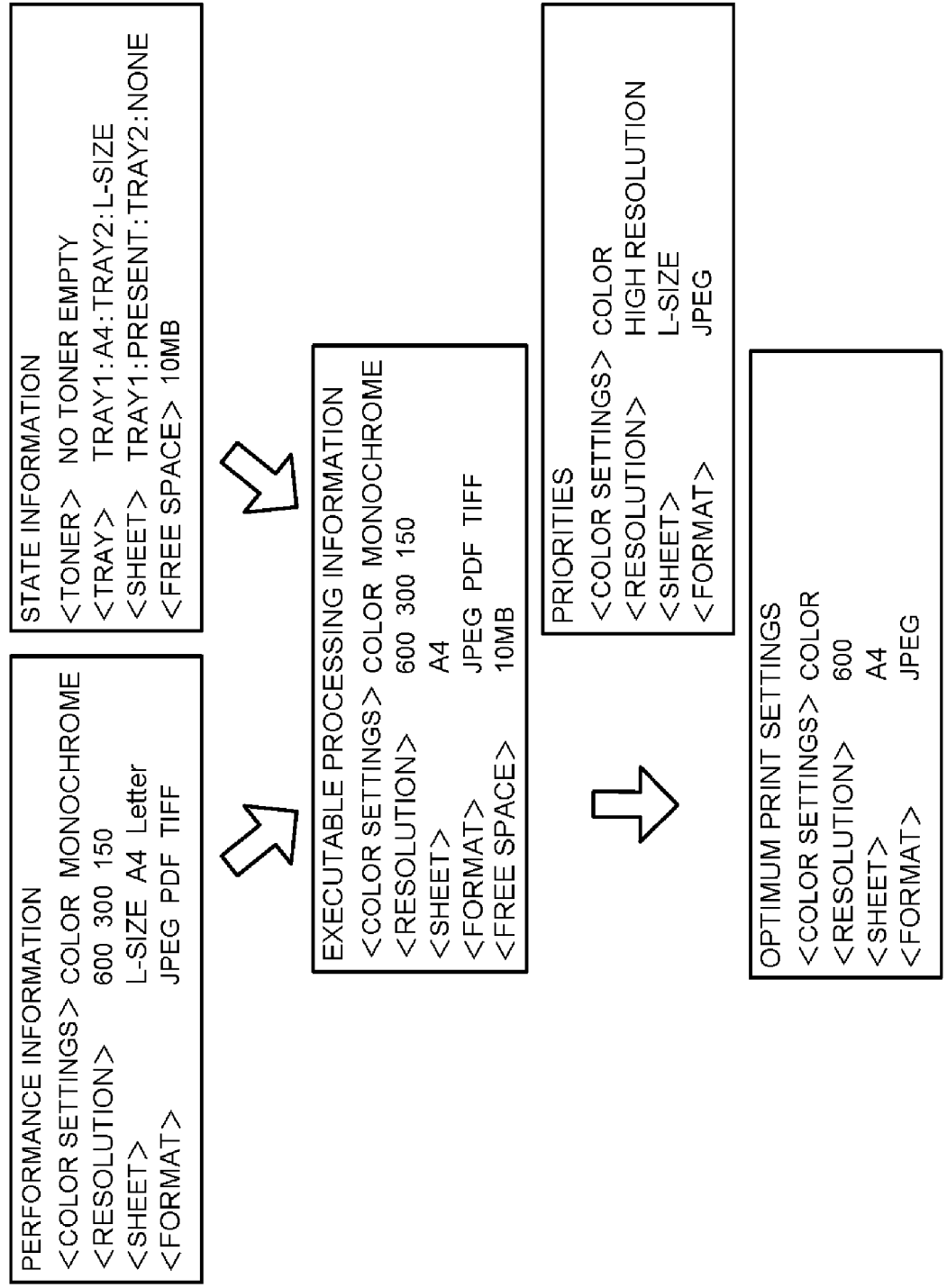
FIG. 5 is chart showing an example method of determining print settings.

After receiving the handover response, the mobile device 100 may determine print settings based on the device information. An example method of determining the print settings is shown in FIG. 5. The MFP 200 may generate executable processing information based on the performance information and the status information of the MFP 200. That is, the MFP 200 may generate executable processing information that may comprise executable print processing items stored in the performance information wherein unexecutable processing items may be deleted from the executable print processing items based on the current status of consumables and an amount of free space in a memory. Subsequently, the MFP 200 may transmit the executable processing information to the mobile device 100, as the device information.

The mobile device 100 may determine print settings based on the received device information, with reference to priorities specified in the mobile device 100. For example, in the example shown in FIG. 5, color settings may comprise color and monochrome and a higher priority may be given to color. Thus, the print settings may comprise color for color settings. Resolution may comprise 600 dpi, 300 dpi, and 150 dpi and a higher priority may be given to high resolution. Thus, the print settings may comprise 600 dpi for resolution. Sheets having L-size (corresponding to 3R or "9×13 cm"), A4-size, or letter-size may be available for the MFP 200. In the MFP 200, for example, sheet types currently specified for trays may be L-size and A4-size, and only tray 1 may store one or more sheets. Thus, the sheet available for printing may be an A4-sized sheet specified in the tray 1. Therefore, even when a higher priority is given to an L-sized sheet, the print settings may comprise an A4-sized sheet for the sheet setting, for example. Nevertheless, when the sheet available for printing is an L-sized sheet, the print settings may comprise an L-sized sheet for the sheet setting. Formats may comprise JPEG (an abbreviation for "Joint Photographic Experts Group"), PDF (an abbreviation for "Portable Document Format"), and TIFF (an abbreviation for "Tagged Image File Format") and a higher priority may be given to JPEG, for example. Thus, in particular configurations, JPEG may be the format set in the print settings. When the amount of the free space in the memory is less than a predetermined amount, image data may be compressed, for example.

Figure 6:
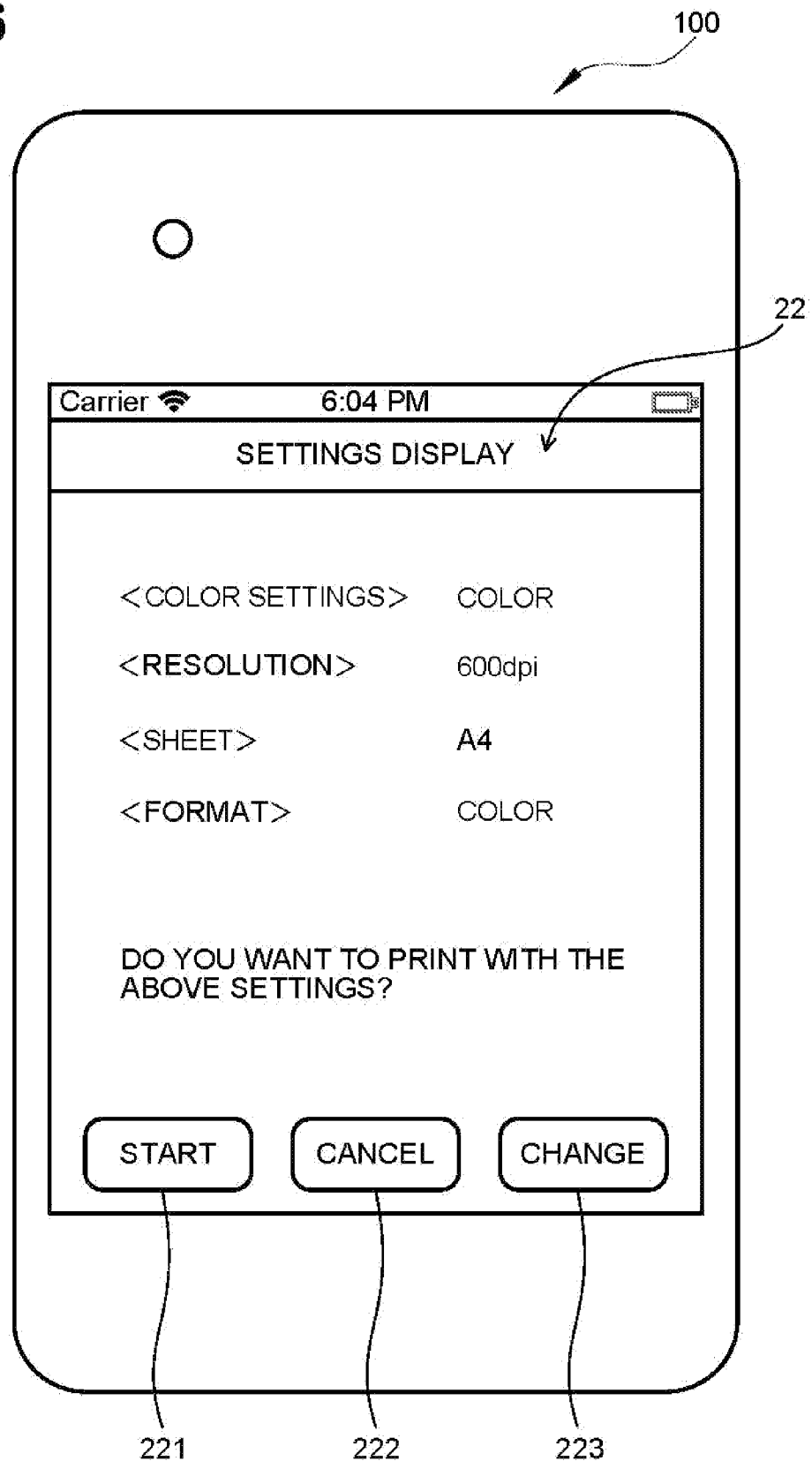
FIG. 6 is a schematic diagram showing an example settings display screen of the application shown in FIG. 3.

Subsequently, the determined print settings may be displayed on a settings display screen 22 of the application 20 as shown in FIG. 6. The settings display screen 22 may comprise a "START" button 221 for accepting an instruction of print execution, a "CANCEL" button 222 for accepting an instruction to cancel a print job, and a "CHANGE" button 223 for accepting an instruction to change the settings display screen 22 to a screen for changing the print settings.

Figure 7:
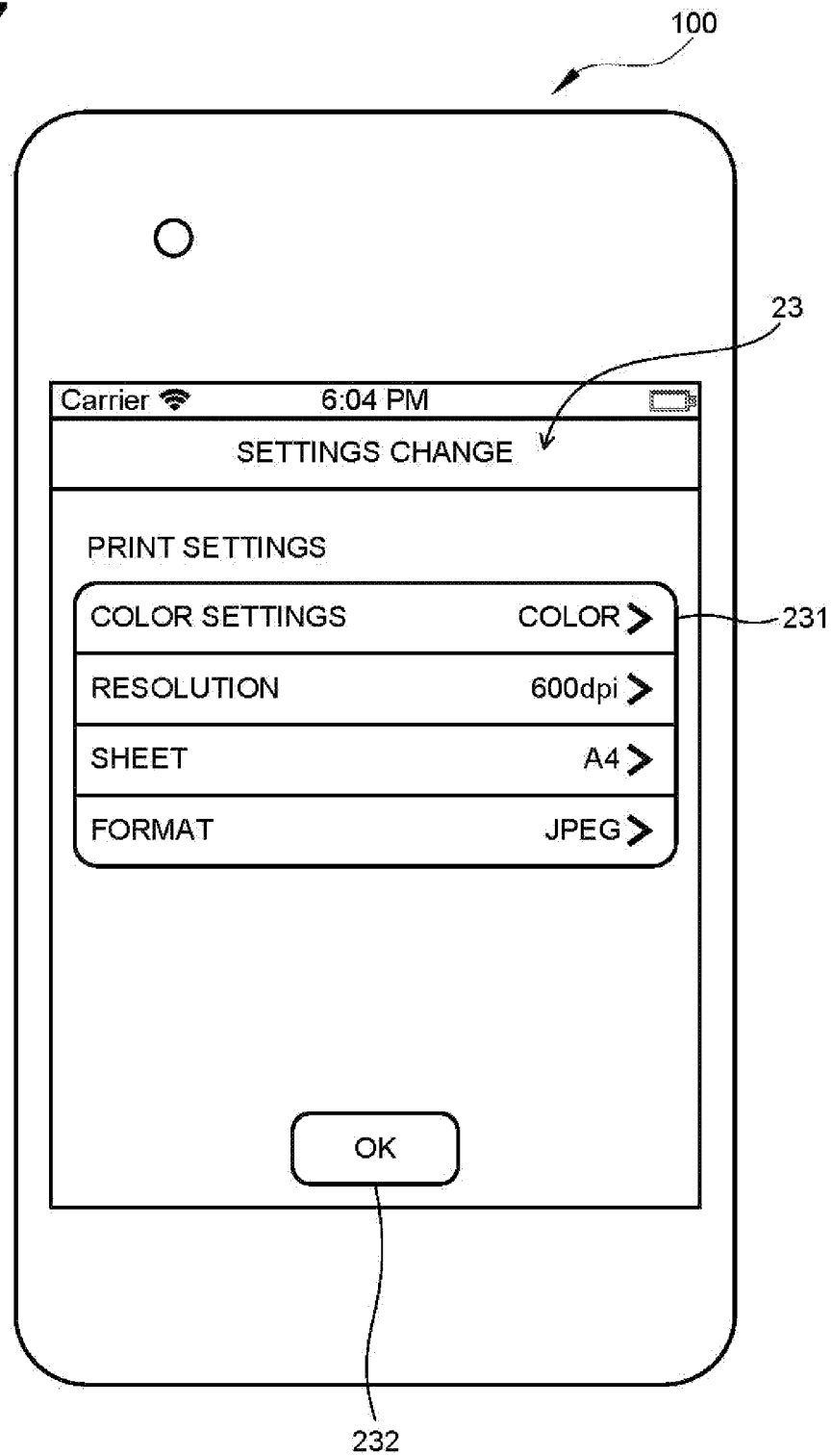
FIG. 7 is a schematic diagram showing an example settings change screen of the application shown in FIG. 3.

When the "CHANGE" button 223 is touched, as shown in FIG. 7, the application 20 may display a settings change screen 23 through which the print settings may be changed. The settings change screen 23 may comprise a change area 231 and an "OK" button 232. In the change area 231, options currently specified in the respective settings may be displayed and each of the currently-specified options may be changed to another option. The "OK" button 232 may be for accepting an instruction to change the settings change screen 23 to the settings display screen 22. On the settings change screen 23, each of the currently-specified options may be changed within a range of the conditions stored in the device information (e.g., the executable print processing information shown in FIG. 5) received from the MFP 200.

For example, in the example shown in FIG. 5, sheets having L-size, A4-size, or letter-size may be available for printing by the MFP 200. Nevertheless, the MFP 200 may be configured to handle an A4-sized sheet only in the current status. Therefore, options other than the A4-sized sheet might not be selected on the settings change screen 23. On the other hand, the MFP 200 may be configured to handle data in PDF format and data in TIFF format, as well as data in JPEG format. Therefore, one of the options of JPEG, PDF, and TIFF may be selected on the settings change screen 23. The changed print settings on the settings change screen 23 may be applied when the "OK" button 232 is touched, and the settings change screen 23 may be changed to the settings display screen 22.

When the "START" button 221 is touched on the settings display screen 22, the mobile device 100 may determine that the print execution instruction is accepted. After accepting the print execution instruction, the mobile device 100 may generate image data for printing in accordance with the recently specified print settings.

Further, the mobile device 100 may use the connection information to establish wireless communication using the WFD protocol with the MFP 200. That is, a handover of the wireless communication protocol from the NFC protocol to the WFD protocol may be implemented. The connection using the WFD protocol may be established after the mobile device 100 receives the connection information from the MFP 200 and may be implemented concurrently with the processing to generate image data for printing. After establishing the wireless communication using the WFD protocol with the MFP 200, the mobile device 100 may transmit, via wireless communication using the WFD protocol, the image data for printing, to the MFP 200.

Upon receipt of the image data for printing, the MFP 200 may start printing the image data. When the MFP 200 completes printing of all pages of the image data, the MFP 200 may transmit a printing completion response to the mobile device 100. The printing completion response may be transmitted via wireless communication using the WFD protocol. Upon receipt of the printing completion response from the MFP 200, the mobile device 100 may disconnect the connection using the WFD protocol established with the MFP 200. Thus, a series of operations performed on the print job in the confirmation print mode may be completed.

Figure 8:
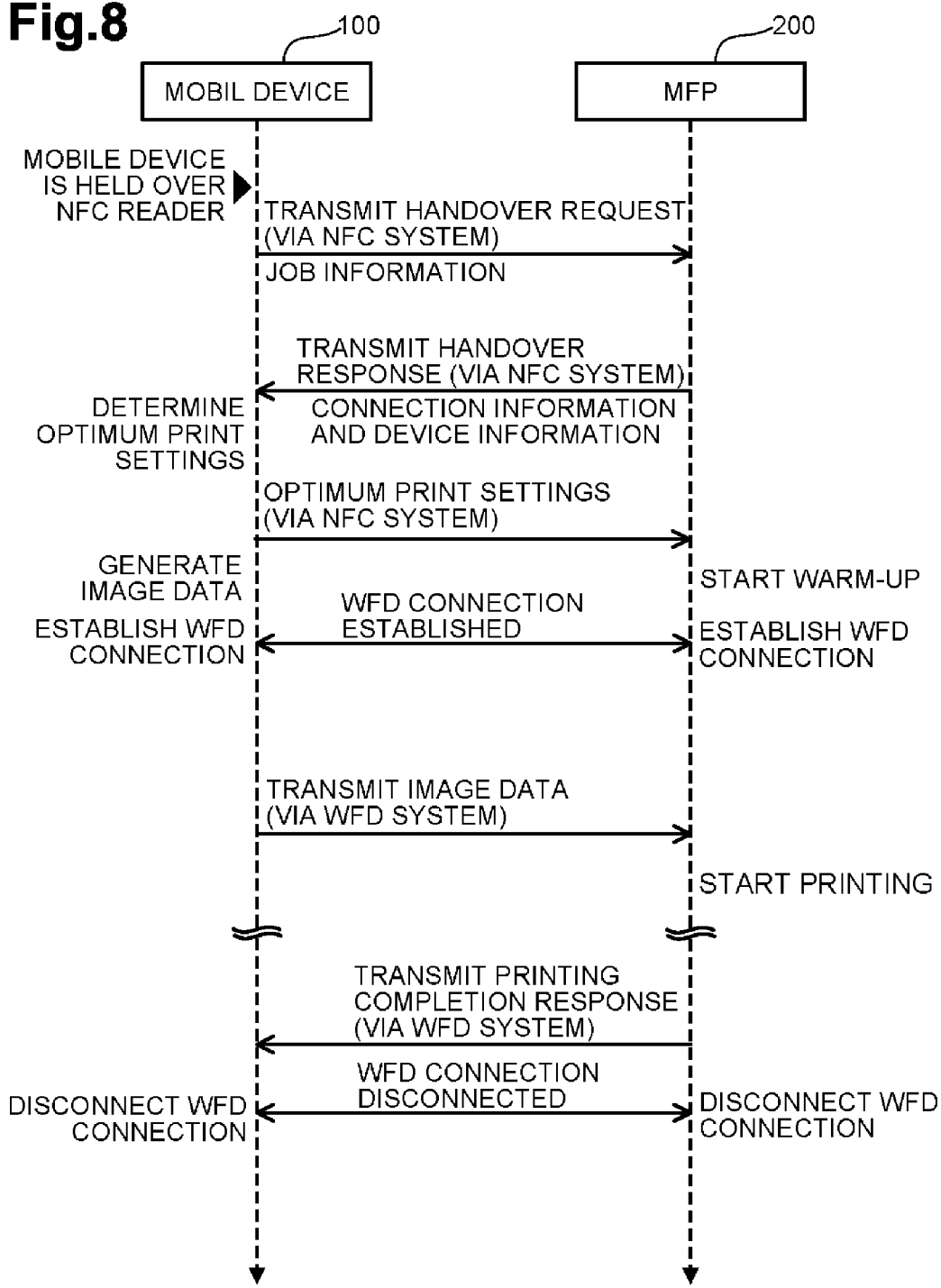
FIG. 8 is a sequence diagram showing an example process of data communication performed between the mobile device and the MFP in an automatic print mode.

When a print job associated with the automatic print mode is placed, as shown in FIG. 8, the mobile device 100 may receive the connection information and the device information from the MFP 200 via wireless communication using the NFC protocol. Subsequently, the mobile device 100 may determine the print settings based on the device information. Thereafter, the mobile device 100 may transmit the print settings to the MFP 200 without displaying the print settings. This may be different from the confirmation print mode in which the print settings may be displayed before printing. The print settings may be transmitted via wireless communication using the NFC protocol.

After receiving the print settings from the mobile device 100, the MFP 200 may start a warm-up of the image forming portion 10 in accordance with the print settings. For example, the MFP 200 may perform the correction process for color printing when the print settings indicate colored printing, and the correction process for monochrome printing may not be performed.

After transmitting the print settings to the MFP 200, the mobile device 100 may generate image data for printing. Further, the mobile device 100 may use the connection information to establish wireless communication using the WFD protocol with the MFP 200 before, after, or concurrently with the generation of the image data for printing. Operations after establishing the wireless communication using the WFD protocol with MFP 200 may be performed in the same manner as described above with respect to the print job associated with the confirmation print mode.

A procedure for performing data communication between the mobile device 100 and the MFP 200 after a scan job is placed in the mobile device 100 now is described for each of the confirmation scan mode, the automatic scan mode, and the dependent scan mode.

Figure 9:
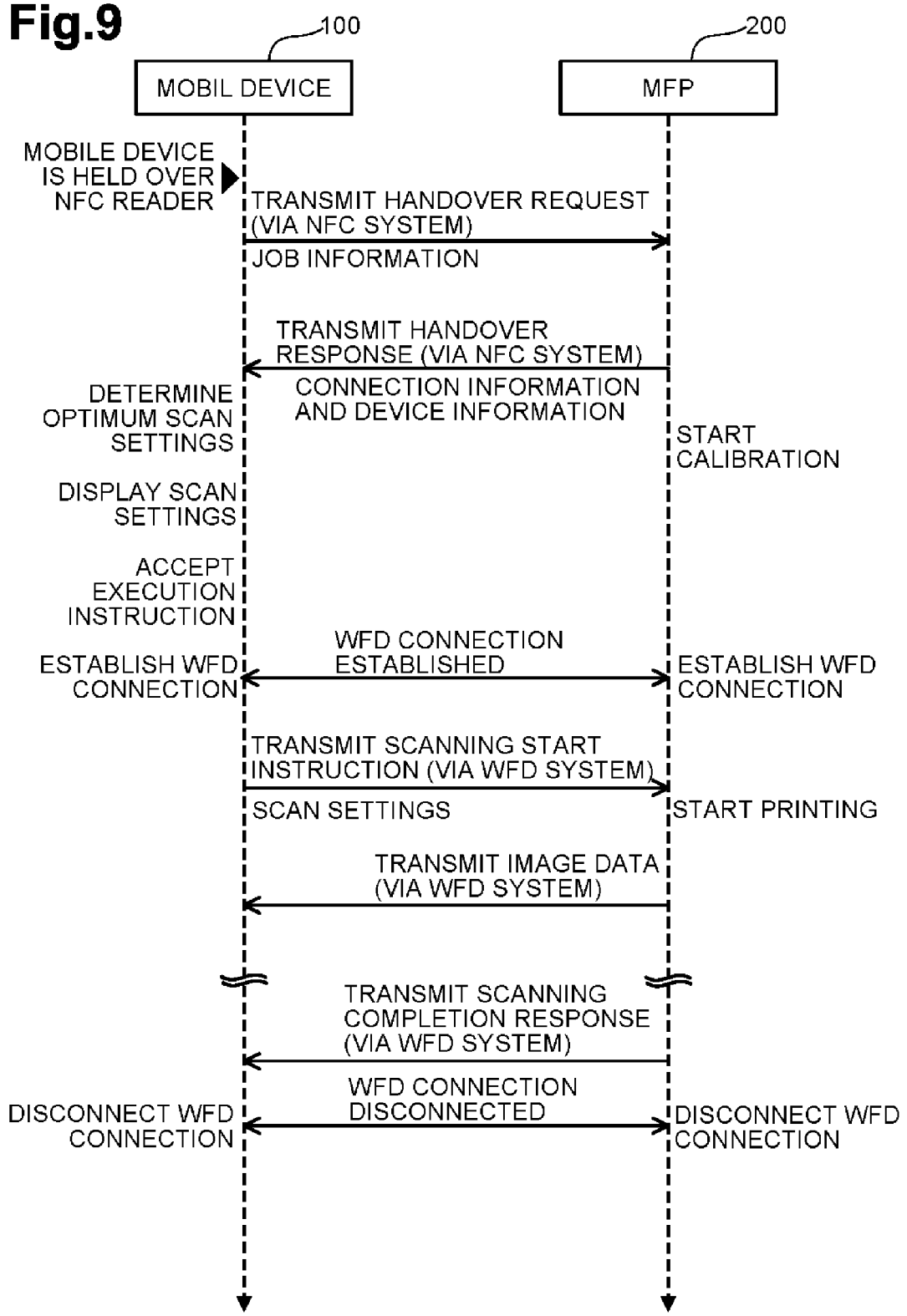
FIG. 9 is a sequence diagram showing an example process of data communication performed between the mobile device and the MFP in a confirmation scan mode.

Operation steps performed when a scan job associated with the confirmation scan mode is placed are described with reference to a sequence diagram shown in FIG. 9. In the confirmation scan mode, the operations from the start to the transmission of the connection information and the device information via wireless communication using NFC protocol may be the same as the operations performed in the confirmation print mode, and thus, a description for the same operations are omitted. In the confirmation print mode, the device information may comprise information related to scanning instead of the information related to printing. The information related to scanning may comprise, for example, information representing whether one or more sheets are placed in an automatic document feeder ("ADF").

After transmitting a handover response to the mobile device 100, the MFP 200 may start calibration of the image reading portion 11. The mobile device 100 may determine the scan settings based on the device information. Then, the mobile device 100 may display the determined scan settings on the settings display screen 22 of the application 20.

When the "START" button 221 is touched on the settings display screen 22, the mobile device 100 may determine that a scan execution instruction is accepted. After accepting the scan execution instruction, the mobile device 100 may use the connection information to establish wireless communication using the WFD protocol with the MFP 200. That is, a handover of the wireless communication protocol from the NFC protocol to the WFD protocol may be implemented. After establishing the wireless communication using the WFD protocol with the MFP 200, the mobile device 100 may transmit a scanning start instruction to the MFP 200 via wireless communication using the WFD protocol. The scanning start instruction may comprise the scan settings.

Upon receipt of the scanning start instruction, the MFP 200 may start scanning one or more documents. When the MFP 200 completes scanning of all of the one or more documents, the MFP 200 may transmit image data of the one or more documents to the mobile device 100. Further, the MFP 200 may transmit a scanning completion response to the mobile device 100 after completing the transmission of the image data. The image data and the scanning completion response may be transmitted via wireless communication using the WFD protocol.

Upon receipt of the image data from the MFP 200, the mobile device 100 may display the image data on the application 20. Upon receipt of the scanning completion response, the mobile device 100 may disconnect the connection using the WFD protocol established with the MFP 200. Thus, a series of operations performed on the print job in the confirmation scan mode may be completed.

Figure 10:
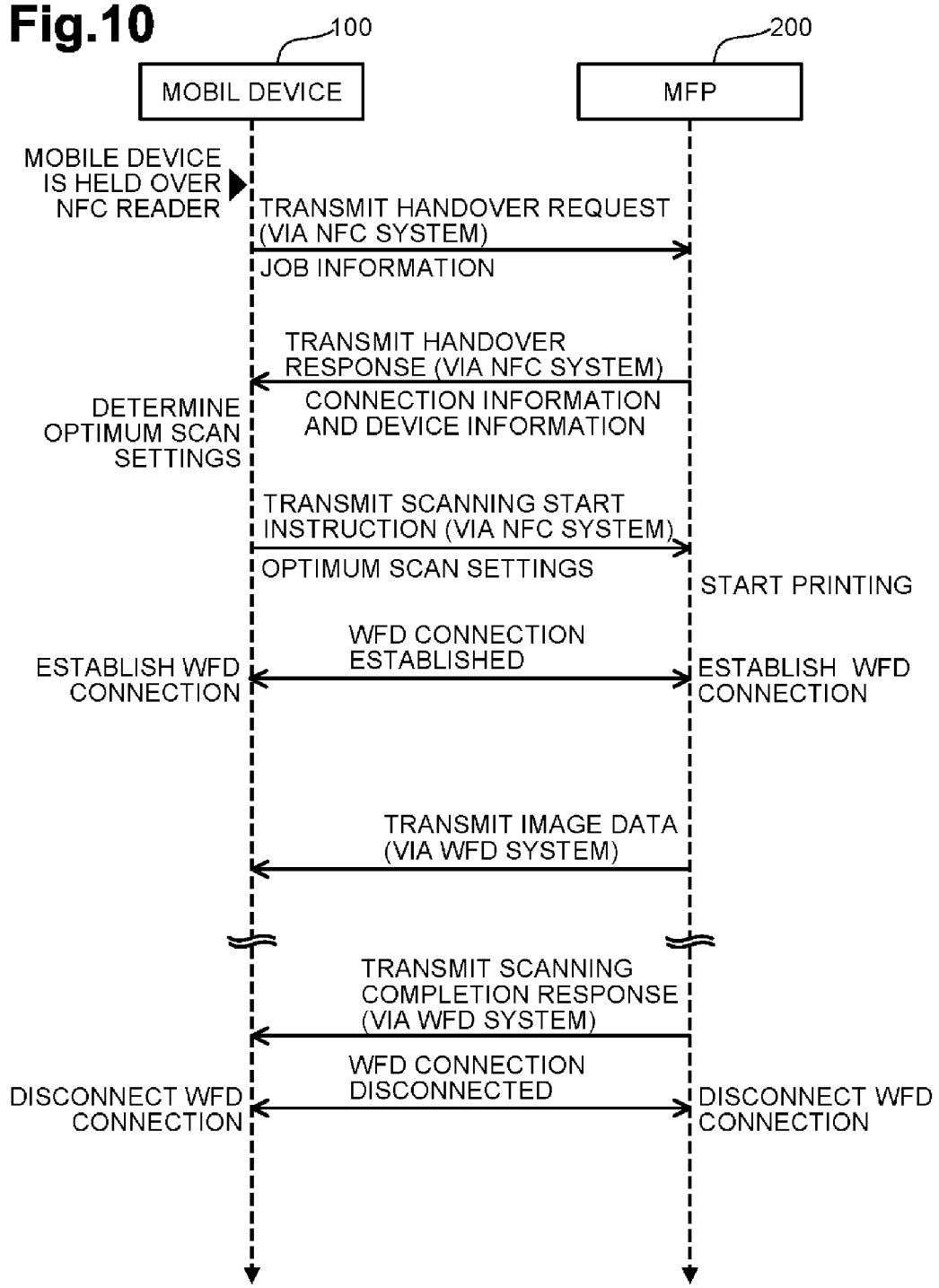
FIG. 10 is a sequence diagram showing an example process of data communication performed between the mobile device and the MFP in an automatic scan mode.

When a scan job associated with the automatic scan mode is placed, as shown in FIG. 10, the mobile device 100 may receive the connection information and the device information from the MFP 200 via wireless communication using the NFC protocol. Subsequently, the mobile device 100 may determine the scan settings based on the device information. Thereafter, the mobile device 100 may transmit the scan settings and a scanning start instruction to the MFP 200, without displaying the scan settings prior to scanning. The scan settings and the scanning start instruction may be transmitted via wireless communication using the NFC protocol.

After receiving the scan settings and the scanning start instruction from the mobile device 100, the MFP 200 may start scanning using the image reading portion 11 in accordance with the scan settings.

After transmitting the scan settings and the scanning start instruction to the MFP 200, the mobile device 100 may use the connection information to establish wireless communication using the WFD protocol with MFP 200. After establishing the wireless communication using the WFD protocol with the MFP 200, the MFP 200 may transmit the image data of the read one or more documents to the mobile device 100. Subsequent operations in the automatic scan mode may be performed in the same manner as those performed when the scan job is associated with the confirmation scan mode.

When a scan job associated with the dependent scan mode is placed, most operations may be performed in the same manner as the those performed when the scan job associated with the automatic scan mode is placed, as shown in FIG. 10. Nevertheless, certain operations that may be performed when the scan job is associated with the automatic scan mode may be different from the operations performed when the scan job is associated with the automatic scan mode. That is, after receiving the connection information and the device information from the MFP 200 via wireless communication using the NFC protocol, the mobile device 100 may transmit a scanning start instruction to the MFP 200, without determining the scan settings. This may be different from the automatic scan mode in which the scan settings may be transmitted together with the scanning start instruction.

After receiving the scanning start instruction from the mobile device 100, the MFP 200 may start scanning in the image reading portion 11 in accordance with the scan settings specified in the MFP 200. After transmitting the scanning start instruction to the MFP 200, the mobile device 100 may perform operations similar to those performed when the scan job is associated with the automatic scan mode.

Processing performed by each device implementing the above-described operations of the image processing system 900 now are described. A print request process performed by the mobile device 100 now is described with reference to flowcharts shown in FIGS. 11 and 12. The print request process may be performed by the CPU 51 when one of the "CONFIRMATION PRINTING" button 211 and the "AUTOMATIC PRINTING" button 212 of the application 20 is selected (e.g., touched).

Figure 11:
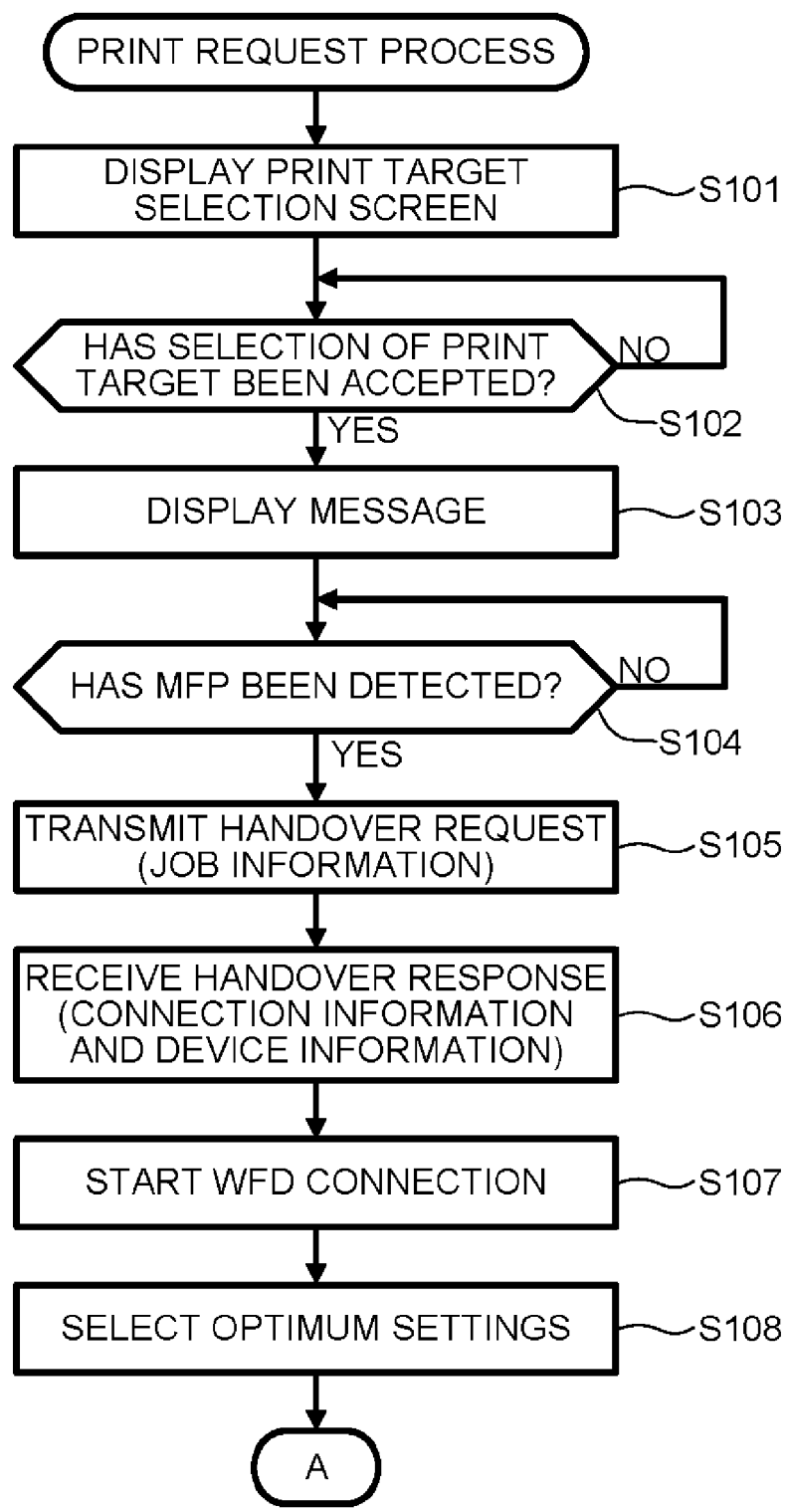
FIG. 11 is a flowchart showing steps in an example print request process performed by the mobile device.

As shown in FIG. 11, in the print request process, the CPU 51 may display a print target selection screen for accepting a selection of data to be printed (hereinafter, the data to be printed also referred to as a "print target") (e.g., step S101). Subsequently, the CPU 51 may determine whether a selection of a print target has been accepted (e.g., step S102). When the CPU 51 determines that the selection of a print target has not been accepted (e.g., NO in step S102), the routine may wait until the CPU 51 determines that the selection of a print target is accepted.

When the CPU 51 determines that a selection of a print target has been accepted (e.g., YES in step S102), the CPU 51 may display a message, such as, for example, a message prompting a user to hold the mobile device 100 over the NFC reader portion 43 of the MFP 200 (e.g., step S103). Subsequent to step S103, the CPU 51 may determine whether an MFP 200 that may be a destination of a print job has been detected (e.g., step S104). The CPU 51 may receive a connection confirmation from the MFP 200 while the mobile device 100 is held over (e.g., within an NFC-communicable distance of) the NFC reader 43 of the MFP 200. When the CPU 51 determines that the mobile device 100 has received the connection confirmation, the CPU 51 may determine that the destination MFP 200 has been detected. While the destination MFP 200 is not detected (e.g., NO in step S104), the routine may wait until the CPU 51 determines that the destination MFP 200 has been detected.

When the CPU 51 determines that the destination MFP 200 has been detected (e.g., YES in step S104), the CPU 51 may transmit a handover request to the detected destination MFP 200 via the NFC I/F 57 (e.g., step S105). In some configurations, the job information may be added to the handover request.

Subsequent to step S105, the CPU 51 may receive a handover response from the destination MFP 200 (e.g., step S106). The connection information necessary to establish a connection using the WFD protocol and the device information of the destination MFP 200 may accompany the handover response.

Thereafter, the CPU 51 may perform processing for establishing wireless communication using the WFD protocol with the MFP 200 by using the connection information received in step S106 (e.g., step S107). Further, the CPU 51 may select print settings based on the device information (e.g., step S108). The processing in step S108 and subsequent steps may be executed in parallel with the processing in S107, for example.

Figure 12:
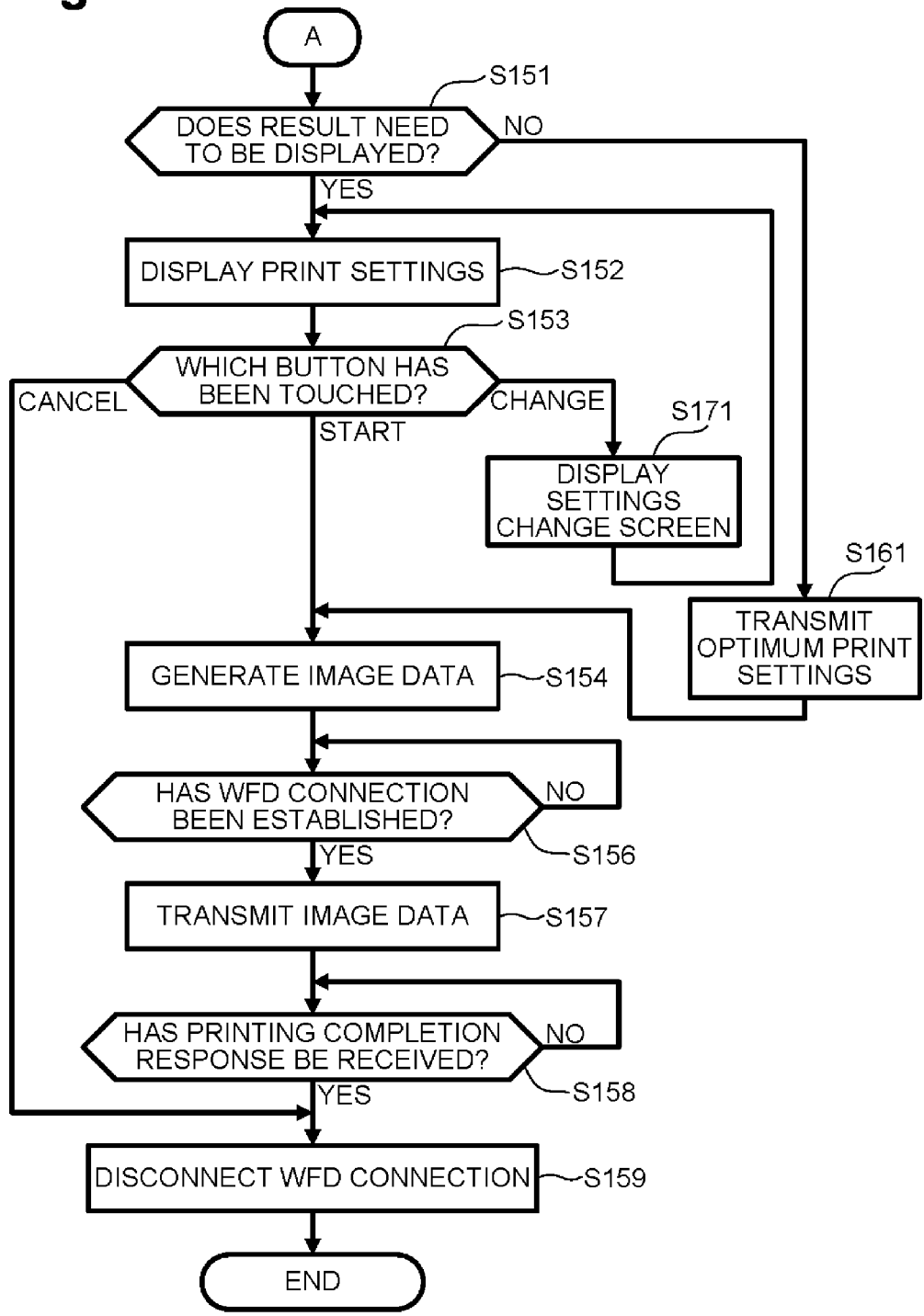
FIG. 12 is a flowchart showing further steps in the example print request process performed by the mobile device of FIG. 11.

Subsequent to step S108, as shown in FIG. 12, the CPU 51 may determine whether a result of the selection of the print settings needs to be displayed (e.g., step S151). In step S151, when the print job is associated with the confirmation print mode, the CPU 51 may determine that the selection result needs to be displayed. When the print job is associated with the automatic print mode, the CPU 51 may determine that the selection result does not need to be displayed. When the CPU 51 determines that the selection result does not need to be displayed (e.g., NO in step S151), the CPU 51 may transmit the print settings selected in step S108 to the MFP 200 via the NFC I/F 57 (e.g., step S161).

When the CPU 51 determines that the selection result needs to be displayed (e.g., YES in step S151), the CPU 51 may display the print settings selected in step S108 on the settings display screen 22 (e.g., step S152). Subsequent to step S152, the CPU 51 may determine which of the buttons on the settings display screen 22 has been touched (e.g., step S153).

When the CPU 51 determines that the "CHANGE" button 223 has been touched (e.g., CHANGE in step S153), the CPU 51 may display the settings change screen 23 to accept changes of the print settings (e.g., step S171). After accepting the changes of the print settings, the routine may proceed to step S152 and the CPU 51 may display the changed print settings on the settings display screen 22. When the CPU 51 determines that the "CANCEL" button 222 has been touched (e.g., CANCEL in step S153), the routine may proceed to step S159 and the CPU 51 may disconnect the communication connection using WFD protocol and then end the print request process.

When the CPU 51 determines that the "START" button 221 has been touched (START in step S153), the CPU 51 may proceed to step S154. In step S154, the CPU 51 may generate image data for printing in accordance with the print settings. For example, when step S154 follows step S153, the CPU 51 may generate image data for printing in accordance with the currently-specified print settings; and, when step S154 follows step S161, the CPU 51 may generate image data for printing in accordance with the print settings selected in step S108. In step S154, the CPU 51 also may compress the image data based on the amount of the free space in the memory of the MFP 200 when the CPU 51 determines, based on the device information acquired in step S106, that the amount of free space in the memory of the MFP 200 is less than or equal to a predetermined value. Accordingly, this compression may prevent the memory of the MFP 200 from filling completely.

Subsequent to step S154, the CPU 51 may determine whether a connection using the WFD protocol has been established (e.g., step S156). The WFD connection start processing in step S107 may be started at an appropriate timing after the processing in step S106 and before the generation of image data in step S154 is completed. For example, the WFD connection start processing (e.g., step S107) may be performed before, after, or concurrently with the generation of image data in step S154. When the CPU 51 determines that a connection using the WFD protocol has not been established (e.g. NO in step S156), the routine may wait until the CPU 51 determines that a connection using the WFD protocol has been established.

When the CPU 51 determines that a connection using the WFD protocol has been established (e.g., YES in step S156), the CPU 51 may transmit the image data for printing, which was generated in step S154, to the MFP 200 via the wireless LAN I/F 58 (e.g., step S157).

Subsequent to step S157, the CPU 51 may determine whether a printing completion response has been received from the destination MFP 200 (e.g., step S158). When the printing completion response has not yet been received (e.g., NO in step S158), the routine may wait until the CPU 51 determines that the printing completion response has been received. When the CPU 51 determines that the printing completion response has been received (e.g., YES in step S158), the CPU 51 may transmit a disconnection confirmation to the MFP 200 and disconnect the wireless communication using the WFD protocol (e.g., step S159). Subsequent to step S159, the CPU 51 may end the print request process.

A scan request process performed by mobile device 100 now is described with reference to flowcharts shown in FIGS. 13 and 14. The scan request process may be performed by the CPU 51 when one of the "CONFIRMATION SCANNING" button 213, the "AUTOMATIC SCANNING" button 214, and the "DEPENDENT SCANNING" button 215 of the application 20 is selected (e.g., touched). Processes that may be substantially similar to the processing in the print request process shown in FIGS. 11 and 12 are assigned with the same reference numerals, respectively, and further description of such processes may be omitted or concisely presented below.

Figure 13:
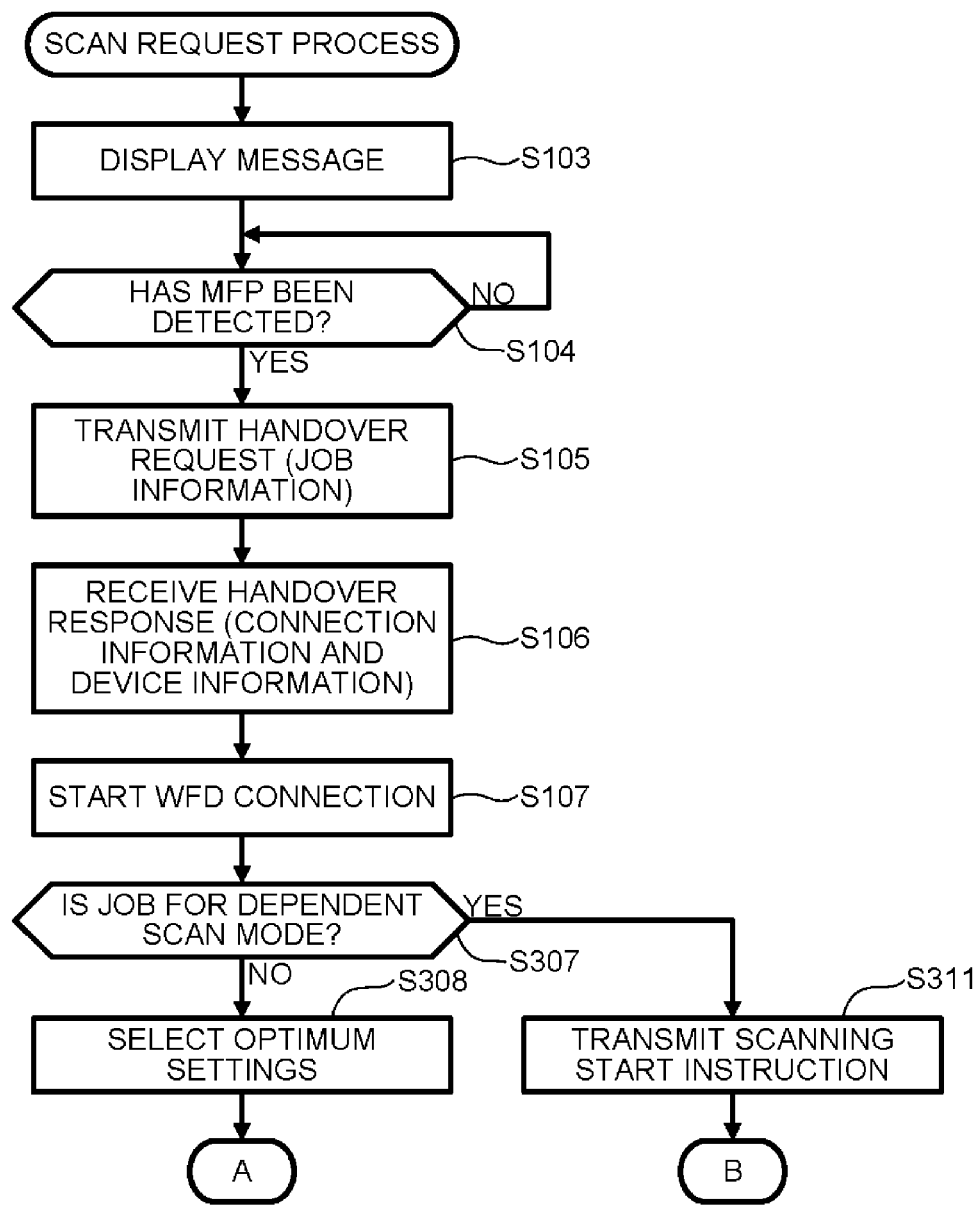
FIG. 13 is a flowchart showing steps in an example scan request process performed by the mobile device.

As shown in FIG. 13, in the scan request process, the CPU 51 may display a message, such as a message prompting the user to hold the mobile device 100 over the NFC reader portion 43 of the MFP 200 (e.g., step S103), for example. Subsequent to step S103, the CPU 51 may determine whether an MFP 200 has been detected (e.g., step S104). When an MFP 200 has not been detected (e.g., NO in step S104), the routine may wait until the CPU 51 determines that an MFP 200 has been detected. When the CPU 51 determines that an MFP 200 has been detected (e.g., YES in step S104), the CPU 51 may transmit a handover request to the detected destination MFP 200 via the NFC I/F 57 (e.g., step S105).

Subsequent to step S105, the CPU 51 may receive a handover response from the destination MFP 200 (e.g., step S106). The CPU 51 may acquire the connection information and the device information from the MFP 200 through the processing in step S106. Subsequent to step S106, the CPU 51 may perform processing for establishing wireless communication using the WFD protocol with the MFP 200 by using the connection information acquired in step S106 (e.g., step S107). The processing in step S307 and subsequent steps (described below in more detail) may be executed in parallel with the processing in S107, for example.

Subsequent to step S106, the CPU 51 may determine whether the placed scan job is associated with the dependent scan mode (e.g., step S307). When the CPU 51 determines that the placed scan job is associated with the dependent scan mode (e.g., YES in step S307), it may be unnecessary to select scan settings performed by the mobile device 100 in step S308 because the scan settings may comply with the scan settings specified in the MFP 200. Thus, the CPU 51 may transmit a scanning start instruction to the MFP 200 via the NFC I/F 57 (e.g., step S311) and the routine may proceed to step S156 in FIG. 14. When the CPU 51 determines that the placed job is not associated with the dependent scan mode (e.g., NO in step S307), the CPU 51 may select scan settings based on the device information acquired in step S106 (e.g., step S308).

Figure 14:
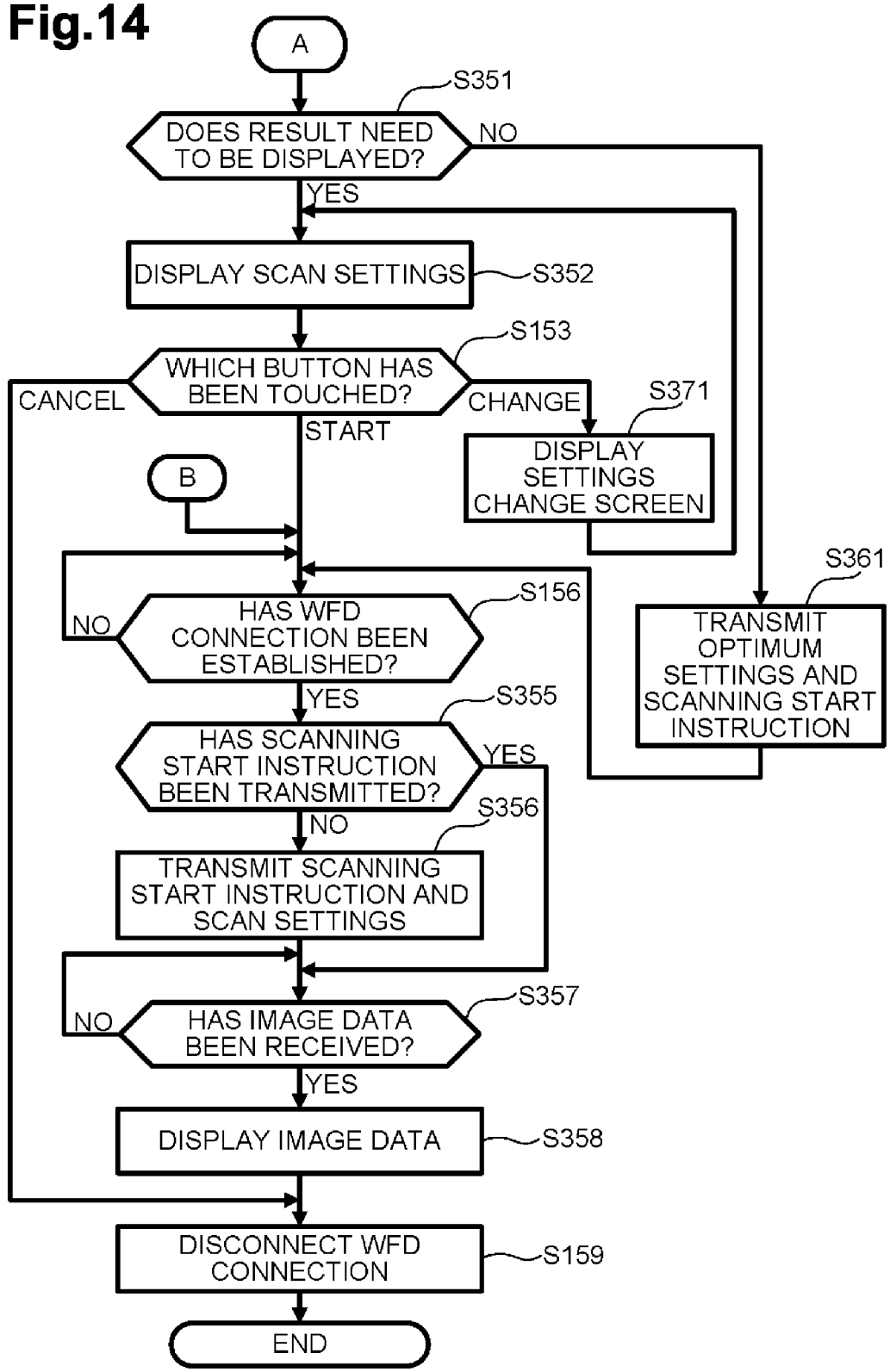
FIG. 14 is a flowchart showing further steps in the example scan request process performed by the mobile device of FIG. 13.

Subsequent to step S308, as shown in FIG. 14, the CPU 51 may determine whether a listing of the selected print settings needs to be displayed (e.g., step S351). In step S351, when the scan job is associated with the confirmation scan mode, the CPU 51 may determine the selection result needs to be displayed (e.g., YES in step 351). When the scan job is associated with the automatic scan mode, the CPU 51 may determine that the selection result does not need to be displayed (e.g., NO in step 351). When the CPU 51 determines that the selection result does not need to be displayed (e.g., NO in step S351), the CPU 51 may transmit the scan settings selected in step S308 to the MFP 200 via the NFC I/F 57 as well as the scanning start instruction (e.g., step S361).

When the CPU 51 determines that the selection result needs to be displayed (e.g. YES in step S351), the CPU 51 may display the scan settings selected in step S308 on the settings display screen 22 (e.g., step S352). Subsequent to step S352, the CPU 51 may determine which of the buttons on the settings display screen 22 has been touched (e.g., step S153).

When the CPU 51 determines that the "CHANGE" button 223 has been touched (e.g., CHANGE in step S153), the CPU 51 may display the settings change screen 23 to accept changes of the scan settings (e.g., step S371). After accepting the changes of the scan settings, the routine may proceed to step S352 and the CPU 51 may display the changed scan settings on the settings display screen 22. When the CPU 51 determines that the "CANCEL" button 222 has been touched (e.g., CANCEL in step S153), the routine may proceed to step S159 and the CPU 51 may disconnect the communication connection using WFD protocol and then end the scan request process.

When the CPU 51 determines that the "START" button 221 has been touched (START in step S153), the CPU 51 may determine whether a connection using the WFD protocol has been established (e.g., step S156). The WFD connection start processing in step S107 may be started at an appropriate timing after the processing in step S106 and before the CPU 51 makes a determination in step S156. For example, the WFD connection start processing may be performed after the "START" button 221 is touched. When the CPU 51 determines that a connection using the WFD protocol has not been established (e.g. NO in step S156), the routine may wait until the CPU 51 determines that a connection using the WFD protocol has been established.

When the CPU 51 determines that a connection using the WFD protocol has been established (e.g., YES in step S156), the CPU 51 may determine whether a scanning start instruction has been transmitted (e.g., step S355). When the CPU 51 determines that a scanning start instruction has not been transmitted (e.g., NO in step S355), the CPU 51 may transmit a scanning start instruction and the currently-specified scan settings to the MFP 200 via the wireless LAN I/F 58 (e.g., step S356).

Subsequent to step S356 or when the CPU 51 determines that a scanning start instruction has been transmitted (e.g., YES in step S355), the CPU 51 may determine whether image data of one or more documents has been received from the MFP 200 (e.g., step S357). When the CPU 51 determines that image data of one or more documents has not been received (e.g., NO in step S357), the routine may wait until the CPU 51 determines that image data of one or more documents has been received.

When the CPU 51 determines that image data of one or more documents has been received (e.g., YES in step S357), the CPU 51 may store the image data on the HDD 54 and display the image data on the application 20 (e.g., step S358). After completing the receipt of the image data of the one or more documents, the CPU 51 may transmit a disconnection confirmation to the MFP 200 and disconnect the wireless communication using the WFD protocol (e.g., step S159). Subsequent to step S159, the CPU 51 may end the scan request process.

A job execution process performed by the MFP 200 now is described with reference to a flowchart shown in FIG. 15. The job execution process may be performed by the CPU 31 when the CPU 31 detects an NFC-enabled device via the NFC I/F 37. In the description below, the detected NFC-enabled device may be the mobile device 100, for example.

In the job execution process, the CPU 31 may receive a handover request transmitted from the mobile device 100 and may obtain job information included in the handover request (e.g., step S201). Thereafter, the CPU 31 may generate device information of the MFP 200 based on the job information (e.g., step S202). That is, the CPU 31 may determine which one of a print job and a scan job has been placed based on the job information. When the CPU 31 determines that a print job has been placed, the CPU 31 may generate device information, including executable specifications, based on the print processing capability and the status of the image forming portion 10. When the CPU 31 determines that a scan job has been placed, the CPU 31 may generate device information including executable specifications, based on the scan processing capability and the status of the image reading portion 11. Then, the CPU 31 may transmit a handover response, to which the device information generated in step S202 and the connection information to be used in communication using the WFD protocol may be added, to the MFP 200 via the NFC I/F 37 (e.g., step S203).

Subsequent to step S203, the CPU 31 may determine, based on the job information, whether the placed job is a print job (e.g., step S204). When the CPU 31 determines that the placed job is a print job (e.g., YES in step S204), the CPU 31 may perform a print job execution process for performing printing (e.g., step S205). When the placed job is a scan job (e.g., NO in step S204), the CPU 31 may perform a scan job execution process for performing scanning of one or more documents (e.g., step S211).

In the print job execution process in step S205, as shown in FIG. 16, the CPU 31 may wait for a predetermined time period (e.g., step S221). The predetermined time period may allow the mobile device 100 to select the print settings in step S108 and to transmit the selection result. The predetermined time period may be extremely short, for example, such as one second or less.

Subsequent to step S221, the CPU 31 may determine whether the print settings have been received from the mobile device 100 (e.g., step S222). When the CPU 31 determines that the print settings have been received (e.g., YES in step S222), the CPU 31 may determine whether the color specification for the print settings is color (e.g., step S231). When the CPU 31 determines that the color specification for the print settings is color (e.g., YES in step S231), the CPU 31 may start a warm-up for color printing (e.g., step S232). The warm-up for color printing comprises, for example, warming-up of the fixing device and a correction operation such as, for example, the color-registration-error correction process. When the CPU 31 determines that the color specification for the print settings is monochrome (e.g., NO in step S231), the CPU 31 may perform a warm-up for monochrome printing (step S233). For example, in the monochrome printing, it may be unnecessary to perform the color-registration-error correction process. Therefore, the CPU 31 may perform the warm-up of the fixing device but might not perform the color-registration-error correction process. That is, when the print settings have been received, the CPU 231 may perform a warm-up appropriate to the color settings.

When the CPU 31 determines that the print settings have not been received (e.g., NO in step S222), that is, when the placed job is associated with the confirmation print mode, the finally-specified print settings are unknown at this moment. Therefore, the CPU 31 may perform a warm-up suitable for any print settings (e.g., step S223). In some configurations, for example, in step S223, the CPU 31 may perform all of warm-ups related to printing when an early start of printing is paramount, and the CPU 31 may perform the warm-up of the fixing device only without performing the correction process when waste of the consumables is restricted.

After starting one or more appropriate warm-ups in step S223, S232, or step S233, the CPU 31 may determine whether a WFD connection confirmation has been received from the mobile device 100 (e.g., step S224). When the CPU 31 determines that a WFD connection confirmation has not been received (e.g., NO in step S224), the routine may wait until the CPU 31 determines that a WFD connection confirmation has been received. When the CPU 31 determines that a WFD connection confirmation has been received (e.g., YES in step S224), the CPU 31 may establish wireless communication using the WFD protocol with the mobile device 100 (e.g., step S225). That is, a handover of the wireless communication protocol from the NFC protocol to the WFD protocol may be implemented.

After the wireless communication using the WFD protocol is established, the CPU 31 may receive image data for printing transmitted from the mobile device 100 via the wireless LAN I/F 58 (e.g., step S226). Upon receipt of the image data, the CPU 31 may instruct the image forming portion 10 to start printing of the image data (e.g., step S227). After instructing the image forming portion 10 to start printing, the CPU 31 may determine whether printing of all pages of the print job has been completed (e.g. step S228). When the CPU 31 determines that the printing of all pages of the print job has not been completed (e.g. NO in step S228), the routine may wait until the CPU 31 determines that the printing of all pages of the print job has been completed.

When the CPU 31 determines that the printing of all pages of the print job has been completed (e.g., YES in step S228), the CPU 31 may transmit a printing completion response to the mobile device 100 (e.g., step S229). Subsequent to step S229, the CPU 31 may disconnect wireless communication using the WFD protocol established between the MFP 200 and the mobile device 100 after receiving a disconnection confirmation from the mobile device 100 (e.g., step S230). Subsequent to step S230, the CPU 31 may end the print job execution process. Thus, the job execution process shown in FIG. 15 also may end.

In the scan job execution process in step S211, as shown in FIG. 17, the CPU 31 may wait for a predetermined time period (e.g., step S251). The predetermined time period may allow the mobile device 100 to select the scan settings in step S308 and then transmit the selection result. The predetermined time period may be extremely short, for example, such as one second or less.

Subsequent to step S251, the CPU 31 may determine whether a scanning start instruction has been received from the mobile device 100 (e.g., step S252). When the CPU 31 determines that a scanning start instruction has been received (e.g., YES in step S252), the CPU 31 may start scanning of one or more documents by the image reading portion 11 (e.g., step S271). In step S271, when the scan job is associated with the automatic scan mode, the CPU 31 may start scanning in accordance with the scan settings added to the scanning start instruction. When the scan job is associated with the dependent scan mode, the CPU 31 may start scanning in accordance with the scan settings specified in the MFP 200.

Subsequent to step S271, the CPU 31 may determine whether a WFD connection confirmation has been received from the mobile device 100 (e.g., step S272). When the CPU 31 determines that a WFD connection confirmation has not been received (e.g., NO in step S272), the routine may wait until CPU 31 determines that a WFD connection confirmation has been received. When the CPU 31 determines that a WFD connection confirmation has been received (e.g., YES in step S272), the CPU 31 may establish wireless communication using the WFD protocol with the mobile device 100 (step S273). That is, a handover of the wireless communication protocol from the NFC protocol to the WFD protocol may be implemented.

When the CPU 31 determines that a scanning start instruction has not been received (e.g., NO in step S252), the CPU 31 may start a calibration at the image reading portion 11 as a preparation to starting scanning of one or more documents (e.g., step S253).

Subsequent to step S253, the CPU 31 may determine whether a WFD connection confirmation has been received from the mobile device 100 (e.g., step S254). When the CPU 31 determines that a WFD connection confirmation has not been received (e.g., NO in step S254), the routine may wait until the CPU 31 determines that a WFD connection confirmation has been received. When the CPU 31 determines that a WFD connection confirmation has been received (e.g., YES in step S254), the CPU 31 may establish wireless communication using the WFD protocol with the mobile device 100 (e.g., step S255). That is, a handover of the wireless communication protocol from the NFC protocol to the WFD protocol may be implemented.

Subsequent to step S255, the CPU 31 may determine whether a scanning start instruction has been received from the mobile device 100 (e.g., step S256). When the CPU 31 determines that a scanning start instruction has not been received from the mobile device 100 (e.g., NO in step S256), the routine may wait until the CPU 31 determines that a scanning start instruction has been received.

When the CPU 31 determines that a scanning start instruction has been received (e.g., YES in step S256), the CPU 31 may start scanning of one or more documents in the image reading portion 11 (e.g. step S257). In step S257, the CPU 31 may start scanning in the confirmation scan mode in accordance with the scan settings added to the scanning start instruction received in step S256.

Subsequent to one or more of steps S257 and S273, the CPU 31 may transmit the read image data to the mobile device 100 via the wireless LAN I/F 58 (e.g., step S258). Thereafter, the CPU 31 may transmit a scanning completion response to the MFP 200 (e.g., step S259), the CPU 31 may disconnect the wireless communication using the WFD protocol established between the MFP 200 and the mobile device 100 after receiving a disconnection confirmation from the mobile device 100 (e.g., step S260). Subsequent to step S260, the CPU 31 may end the scan request process. Thus, the job execution process shown in FIG. 15 also may end.

As described above, the image processing system 900 may be configured such that, when the connection information is transmitted via wireless communication using the NFC protocol (an example of short-range communication), specific information to be used for the execution of a job may also be transmitted. With this configuration, before wireless communication using the WFD protocol (an example of long-range communication) is established, the mobile device 100 may start at least one or more processing steps of the process for completing the job, such as one or more of the processing for confirming one of the print settings and the scan settings and the processing for determining the image processing settings, via the transmission of the device information as the specific information to the mobile device 100 from the MFP 200. For example, the MFP 200 may start at least one or more processing steps of the process for completing the job, such as the warm-up of one of the image forming portion 10 and the image reading portion 11 or one or more processing steps of scanning, by the transmission of the job information as the specific information to the MFP 200 from the mobile device 100. As described above, the process for completing a job may be started before long-range communication is established. Therefore, this configuration may shorten the time required to complete a job as compared with a configuration in which the process for completing a job is started after long-range communication is established.

While the invention has been described in detail with reference to particular configurations thereof, such configurations are merely examples, and various changes, arrangements and modifications may be applied therein without departing from the spirit and scope of the disclosure. In some configurations, for example, the information processing apparatus for inputting a job may be any device that may be allowed to perform wireless communication and configured to perform a function of controlling the image processing apparatus. The mobile device 100 may be, for example, a smartphone or a tablet PC. Further, the image processing apparatus may be any device that may perform the image processing function, such as, for example, a copying machine, a printer, a scanner, or a facsimile machine, as well as a multifunction peripheral (e.g., the MFP 200).

In particular configurations, the NFC protocol may be adopted as the short-range communication, the WFD protocol may be adopted as the long-range communication, and the handover from the NFC protocol to the WFD protocol may be implemented. Nevertheless, the communication protocol for implementing the handover is not limited to the NFC protocol and the WFD protocol. Different communication protocols with different communication ranges or protocols may be adopted. For example, in some configurations, one or more of a Bluetooth® protocol, a TransferJet protocol, and a Wi-Fi® protocol for non-direct communication using an access point may be adopted as the communication protocol.

In particular configurations, as the processing performed before long-range communication is established, the determination of the settings, the confirmation of the image processing settings, and the generation of image data may each be performed in the mobile device 100, and one or more of scanning and the startup operation of one of the image forming portion 10 and the image reading portion 11 may be performed in the MFP 200. Nevertheless, the processing step started before long-range communication is established is not limited to such a configuration. That is, as the processing performed before long-range communication is established, at least one processing step may be started and the other processing steps may be started after long-range communication is established. Accordingly, at least one of the job information and the device information may be selected appropriately, as information transmitted or received via short-range communication, in accordance with the one or more processing steps started before long-range communication is established. For example, when the mobile device 100 starts one or more processing steps and the MFP 200 does not start any processing step, the MFP 200 may transmit the device information, but not the job information, to the mobile device 100. When the MFP 200 starts one or more processing steps and the mobile device 100 does not start any processing step, the mobile device 100 may transmit the job information, but not the device information, to the MFP 200. With this configuration, at least one processing step may be started at an earlier timing, and thus, the time required to complete a job may be shortened.

In particular configurations, the image processing settings may be determined based on the device information transmitted from the MFP 200. Nevertheless, in some configurations, for example, this processing may be omitted. That is, some alternative systems may not support one or more of the automatic print mode and the automatic scan mode. The selection of the image processing settings based on the device information may be left to one or more of the MFP 200 and an external decision-maker when the automatic selection of the image processing settings is not performed.

In particular configurations, the MFP 200 may transmit the information comprising both of the performance information and the status information to the mobile device 100 as the device information. Nevertheless, in some configurations, for example, the MFP 200 may transmit only one of the performance information and the status information. That is, the mobile device 100 may determine the image processing settings based on one of the performance information and the status information. In another configuration, the MFP 200 may transmit both of the performance information and the status information, and the mobile device 100 may generate device information comprising a combination of the performance information and the status information.

The processes described above may be performed by, for example, a single CPU, a plurality of CPUs, hardware (e.g., a special application specific integrated circuit ("ASIC")), or a combination thereof (e.g., a combination of a CPU and an ASIC). Further, the processes described above may be implemented in various manners, such as, for example, by executing one or more programs stored on computer-readable storage media or by performing methods implementing the above-described processes.

While the invention has been described in connection with various exemplary structures and illustrative configurations, it will be understood by those skilled in the art that other variations and modifications of the structures, configurations, and embodiments disclosed above may be made without departing from the scope of the invention. For example, this application comprises each and every possible combination of the various elements and features disclosed and incorporated by reference herein, and the particular elements and features presented in the claims and disclosed and incorporated by reference above may be combined with each other in each and every possible way within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. An image processing system comprising:
an image processing apparatus; and
an information processing apparatus,
wherein the image processing apparatus comprises:
  a first communication device configured to communicate using a first communication protocol; and
  a second communication device configured to communicate using a second communication protocol,
wherein the information processing apparatus comprises:
  a third communication device configured to communicate using the first communication protocol; and
  a fourth communication device configured to communicate using the second communication protocol,
wherein the first communication device and the third communication device are configured to communicate therebetween using the first communication protocol to transmit connection information between the first communication device and the third communication device, the connection information comprising information for establishing communication using the second communication protocol,
wherein the second communication device and the fourth communication device are configured to use the connection information to establish communication therebetween using the second communication protocol and to transmit image data between the second communication device and the fourth communication device using the second communication protocol,
wherein at least one of the image processing apparatus and the information processing apparatus is configured to start one or more processing steps for completing a job prior to the second communication device and the fourth communication device establishing communication therebetween using the second communication protocol.

2. A data processing apparatus comprising:
a controller comprising one or more control devices;
a communication device configured to communicate using a first communication protocol; and
an other communication device configured to communicate using a second communication protocol,
wherein the controller is configured to control the communication device to communicate with an external device using the first communication protocol to transmit connection information between the communication device and the external device, the connection information comprising information for establishing communication using the second communication protocol,
wherein the controller is configured to control the other communication device to communicate with the external device using the second communication protocol after the connection information is used to establish communication between the other communication device and the external device using the second communication protocol,
wherein the communication between the other communication device and the external device using the second communication protocol comprises at least one of:
  transmitting image data from the other communication device to the external device; and
  receiving the image data by the other communication device from the external device, and
wherein the controller is configured to control the data processing apparatus to start one or more processing steps for completing a job prior to the communication between the other communication device and the external device using the second communication protocol being established.

3. The data processing apparatus according to claim 2,
wherein the job is a print job for printing one or more images based on the image data, and
wherein the controller is configured to determine whether a print target for the job has been selected when communication using the first communication protocol is established between the communication device and the external device, and
wherein, in response to determining that the print target for the job has been selected when the communication using the first communication protocol is established between the communication device and the external device, the controller is configured to:
  control the communication device to communicate with the external device using the first communication protocol to transmit the connection information between the communication device and the external device;

control the other communication device to communicate with the external device using the second communication protocol after the connection information is used to establish the communication between the other communication device and the external device using the second communication protocol; and control the data processing apparatus to start the one or more processing steps for completing the job prior to the communication between the other communication device and the external device using the second communication protocol being established.

4. The data processing apparatus according to claim 2, wherein the job is a scan job for scanning one or more images to generate the image data, and wherein the controller is configured to determine whether a scan request has been initiated when communication using the first communication protocol is established between the communication device and the external device, and wherein, in response to determining that the scan request has been initiated when the communication using the first communication protocol is established between the communication device and the external device, the controller is configured to:

control the communication device to communicate with the external device using the first communication protocol to transmit the connection information between the communication device and the external device;

control the other communication device to communicate with the external device using the second communication protocol after the connection information is used to establish the communication between the other communication device and the external device using the second communication protocol; and control the data processing apparatus to start the one or more processing steps for completing the job prior to the communication between the other communication device and the external device using the second communication protocol being established.

5. The data processing apparatus according to claim 2, wherein the controller is configured to control the data processing apparatus to start the one or more processing steps for completing the job prior to the communication between the other communication device and the external device using the second communication protocol being established and after the communication between the communication device and the external device using the first communication protocol is established.

6. The data processing apparatus according to claim 5, wherein the controller is configured to control the communication device to receive specific information from the external device using the first communication protocol, the specific information identifying at least one of a processing capability of the external device and a status of the external device.

7. The data processing apparatus according to claim 6, wherein the processing capability of the external device identified by the specific information comprises at least one of:

a color-printing capability of the external device;

a maximum resolution available for printing performed by the external device;

a color-scanning capability of the external device;

a maximum resolution available for scanning performed by the external device; and information identifying one or more image data formats that are compatible with the external device, and wherein the status of the external device identified by the specific information comprises at least one of:

an amount of available space in a memory of the external device;

an amount of consumables remaining in the external device; and whether an error has occurred in the external device.

8. The data processing apparatus according to claim 6, wherein the specific information identifies the status of the external device, wherein the status of the external device identified by the specific information comprises an amount of available space in a memory of the external device, and wherein the one or more processing steps for completing the job comprise compressing the image data based on the amount of available space in the memory of the external device.

9. The data processing apparatus according to claim 6, wherein the specific information identifies the processing capability of the external device, wherein the processing capability of the external device identified by the specific information comprises information identifying one or more image data formats that are compatible with the external device, and wherein the one or more processing steps for completing the job comprise generating the image data in an image data format selected from the one or more image data formats that are compatible with the external device.

10. The data processing apparatus according to claim 6, wherein the specific information identifies the processing capability of the external device, wherein the processing capability of the external device identified by the specific information comprises a color-printing capability of the external device, wherein the one or more processing steps for completing the job comprise generating the image data as color image data when the color-printing capability of the external device indicates that the external device is capable of printing in color, and wherein the one or more processing steps for completing the job comprise generating the image data as monochrome image data when the color-printing capability of the external device indicates that the external device is not capable of printing in color.

11. The data processing apparatus according to claim 6, wherein the one or more processing steps for completing the job comprise displaying a setting screen identifying settings for performing the job that are set based on the at least one of the processing capability of the external device and the status of the external device.

12. The data processing apparatus according to claim 5, further comprising an image reading device, wherein the one or more processing steps for completing the job comprise reading, by the image reading device, an image from a document.

13. The data processing apparatus according to claim 5, further comprising a printing device, wherein the one or more processing steps for completing the job comprise warming up the printing device for printing.

14. The data processing apparatus according to claim 5, wherein the controller is configured to control the communication device to receive, from the external device using the first communication protocol, specific information identifying a type of the job, and wherein the one or more processing steps for completing the job comprise a correction operation for color printing when the type of the job identified by the specific information is a color printing job.

15. The data processing apparatus according to claim 5, wherein the controller is configured to control the communication device to transmit to the external device using the first communication protocol specific information identifying a processing capability of the data processing apparatus.

16. The data processing apparatus according to claim 5, wherein the controller is configured to control the communication device to transmit to the external device using the first communication protocol specific information identifying a status of the data processing apparatus.

17. The data processing apparatus according to claim 5, wherein the one or more processing steps for completing the job comprise generating the image data in an image data format that is compatible with the external device.

18. A non-transitory computer-readable medium storing computer-readable instructions that, when executed by a processor of a data processing apparatus, instruct the processor to perform processes comprising:
controlling a communication device to communicate with an external device using a first communication protocol to transmit connection information between the communication device and the external device, the connection information comprising information for establishing communication using a second communication protocol;
controlling an other communication device to communicate with the external device using the second communication protocol after the connection information is used to establish communication between the other communication device and the external device using the second communication protocol;
wherein the communication between the other communication device and the external device using the second communication protocol comprises at least one of:
transmitting image data from the other communication device to the external device; and
receiving the image data by the other communication device from the external device, and
controlling the data processing apparatus to start one or more processing steps for completing a job prior to the communication between the other communication device and the external device using the second communication protocol being established.

19. The non-transitory computer-readable medium according to claim 18,
wherein the job is a print job for printing one or more images based on the image data, and
wherein the computer-readable instructions instruct the processor to determine whether a print target for the job has been selected when communication using the first communication protocol is established between the communication device and the external device, and
wherein the computer-readable instructions instruct the processor, such that in response to determining that the print target for the job has been selected when the communication using the first communication protocol is established between the communication device and the external device, the processor performs processes comprising:
the controlling the communication device to communicate with the external device using the first communication protocol to transmit the connection information between the communication device and the external device;
the controlling the other communication device to communicate with the external device using the second communication protocol after the connection information is used to establish the communication between the other communication device and the external device using the second communication protocol; and
the controlling the data processing apparatus to start the one or more processing steps for completing the job prior to the communication between the other communication device and the external device using the second communication protocol being established.

20. The non-transitory computer-readable medium according to claim 18,
wherein the job is a scan job for scanning one or more images to generate the image data, and
wherein the computer-readable instructions instruct the processor to determine whether a scan request has been initiated when communication using the first communication protocol is established between the communication device and the external device, and
wherein the computer-readable instructions instruct the processor, such that in response to determining that the scan request has been initiated when the communication using the first communication protocol is established between the communication device and the external device, the processor performs processes comprising:
the controlling the communication device to communicate with the external device using the first communication protocol to transmit the connection information between the communication device and the external device;
the controlling the other communication device to communicate with the external device using the second communication protocol after the connection information is used to establish the communication between the other communication device and the external device using the second communication protocol; and
the controlling the data processing apparatus to start the one or more processing steps for completing the job prior to the communication between the other communication device and the external device using the second communication protocol being established.

21. The non-transitory computer-readable medium according to claim 18,
wherein controlling the data processing apparatus to start the one or more processing steps comprises controlling the data processing apparatus to start the one or more processing steps for completing the job prior to the communication between the other communication device and the external device using the second communication protocol being established and after the communication between the communication device and the external device using the first communication protocol is established.

22. The non-transitory computer-readable medium according to claim 21 wherein the computer-readable instructions instruct the processor to control the communication device to receive specific information from the external device using the first communication protocol, the specific information identifying at least one of a processing capability of the external device and a status of the external device.

23. The non-transitory computer-readable medium according to claim 22,
  wherein the processing capability of the external device identified by the specific information comprises at least one of:
    a color-printing capability of the external device;
    a maximum resolution available for printing performed by the external device;
    a color-scanning capability of the external device; a maximum resolution available for scanning performed by the external device; and
    information identifying one or more image data formats that are compatible with the external device, and
  wherein the status of the external device identified by the specific information comprises at least one of:
    an amount of available space in a memory of the external device;
    an amount of consumables remaining in the external device; and
    whether an error has occurred in the external device.

24. The non-transitory computer-readable medium according to claim 21,
  wherein the one or more processing steps for completing the job comprise generating the image data in an image data format that is compatible with the external device.

* * * * *